US012406233B2

(12) United States Patent
Shao et al.

(10) Patent No.: US 12,406,233 B2
(45) Date of Patent: Sep. 2, 2025

(54) METHODS AND SYSTEMS FOR SAFETY MONITORING OF PIPELINE OPERATION STATUS BASED ON SMART GAS INTERNET OF THINGS

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yuefei Wu, Chengdu (CN); Yongzeng Liang, Chengdu (CN)

(73) Assignee: CHENGDU QINCHUAN IOT TECHNOLOGY CO., LTD., Chengdu (CN)

(*) Notice: Subject to any disclaimer, the term of this patent is extended or adjusted under 35 U.S.C. 154(b) by 0 days.

(21) Appl. No.: 18/822,445

(22) Filed: Sep. 2, 2024

(65) Prior Publication Data

US 2024/0428205 A1 Dec. 26, 2024

(30) Foreign Application Priority Data

Jul. 8, 2024 (CN) .......................... 202410903115.5

(51) Int. Cl.
*G06Q 10/20* (2023.01)
*G06Q 50/06* (2024.01)
(Continued)

(52) U.S. Cl.
CPC ............ *G06Q 10/20* (2013.01); *G06Q 50/06* (2013.01); *G16Y 10/35* (2020.01); *G16Y 40/10* (2020.01)

(58) Field of Classification Search
CPC ......... G06Q 10/20; G06Q 50/06; G16Y 10/35
See application file for complete search history.

(56) References Cited

U.S. PATENT DOCUMENTS

| 2003/0171879 A1* | 9/2003 | Pittalwala ................ F17D 5/00 702/34 |
| 2018/0275100 A1* | 9/2018 | Sutherland ........... G05D 7/0676 |
| 2020/0191316 A1* | 6/2020 | Du ..................... G06Q 10/0635 |

FOREIGN PATENT DOCUMENTS

| CA | 2797723 A1 | 8/2013 |
| CN | 102176239 A | 9/2011 |

(Continued)

OTHER PUBLICATIONS

Cook et al., IoT Natural Gas Pipeline Monitoring System, Proceedings of the 2nd International Conference on Innovative Intelligent Industrial Production and Logistics (IN4PL 2021), pp. 168-173, retrieved from url: <https://www.scitepress.org/Papers/2021/107136/107136.pdf> (2021).*

(Continued)

*Primary Examiner* — Julie M Shanker
(74) *Attorney, Agent, or Firm* — METIS IP LLC

(57) ABSTRACT

Disclosed is method and system for safety monitoring of pipeline operation status based on smart gas IoT. The method includes: obtaining operation data of a gas pipeline in a monitoring area; obtaining candidate pipeline information; obtaining candidate pipeline information; determining, based on the candidate pipeline information, target pipeline information, and sending the target pipeline information to the gas company management platform through the government safety supervision sensor network platform; generating, based on the target pipeline information, a maintenance instruction, and sending the maintenance instruction to a device object platform; sending the monitoring adjustment instruction to the plurality of target monitoring devices through the device object platform; sending the storage allocation instruction to the storage unit through the device object platform to control the storage unit to delete outdated (Continued)

monitoring data and adjust the allocation ratio according to the allocation ratio and the minimum allocation space.

11 Claims, 5 Drawing Sheets

(51) Int. Cl.
  *G16Y 10/35* (2020.01)
  *G16Y 40/10* (2020.01)

(56) References Cited

FOREIGN PATENT DOCUMENTS

| CN | 104700506 | A | 6/2015 | | |
| CN | 208154112 | U | 11/2018 | | |
| CN | 113902270 | A | 1/2022 | | |
| CN | 115879913 | A | 3/2023 | | |
| CN | 116485066 | A | 7/2023 | | |
| CN | 117578691 | A | 2/2024 | | |
| CN | 117952282 | A | 4/2024 | | |
| CN | 118195838 | A | 6/2024 | | |
| WO | WO-2012151535 | A1 | * | 11/2012 | ............ F16L 58/00 |

OTHER PUBLICATIONS

Notification to Grant Patent Right for Invention in Chinese Application No. 202410903115.5 mailed on Aug. 22, 2024, 4 pages.
First Office Action in Chinese Application No. 202410903115.5 mailed on Aug. 7, 2024, 12 pages.
Zha, Sixi et al., Analysis and Suggestions on Current Situation of Indoor Gas Security Inspection of Small and Medium-sized Gas Companies, Gas & Heat, 2017, 7 pages.
Shao, Zehua et al., Internet of Things Smart Gas Meter Gas Abnormal State Perception and Control, Gas & Heat, 2020, 6 pages.

* cited by examiner

METHODS AND SYSTEMS FOR SAFETY MONITORING OF PIPELINE OPERATION STATUS BASED ON SMART GAS INTERNET OF THINGS

CROSS-REFERENCES TO RELATED APPLICATIONS

This application claims priority to Chinese Patent Application No. 202410903115.5 filed on Jul. 8, 2024, the entire contents of which is incorporated herein by reference.

TECHNICAL FIELD

The present disclosure relates to the field of gas regulation, and in particular to a method and a system for safety monitoring of a pipeline operation status based on the smart gas Internet of Things.

BACKGROUND

An operation status of a gas pipeline is directly related to safety and stability of gas supply. By monitoring the operation status of the gas pipeline, potential safety hazards may be detected in time, so that timely measures are taken to repair and avoid accidents. Currently, monitoring of the operation status of the gas pipeline is mainly performed independently on different gas pipelines based on a resident number and a building number around the gas pipeline, or performed independently on different gas pipelines combining historical gas failures and a frequency of gas accidents. However, due to an extremely low incidence of the gas pipeline failures/accidents, the applicability of a preset regulatory level in this manner is poor, which does not reflect a potential impact of the operation of the gas pipeline (i.e., a lifespan and a maintenance period), and of a use of different gas users (gas companies) at different times, a preset manual periodic inspection and scheduling tends to be inefficient, and sometimes does not serve a purpose of preventing accidents from occurring.

There is therefore a need to provide a method and a system for safety monitoring of a pipeline operation status based on a smart gas Internet of Things, which is capable of intelligently supervising and identifying the operation statuses of different gas pipelines in different regions on a full-cycle basis, assessing operation status trends of different gas pipelines in a timely manner, and performing timely and targeted warning or adjustment.

SUMMARY

To solve the problem of lower efficiency and poorer generalization ability of monitoring gas pipelines, the present disclosure provides a method and a system for safety monitoring of a pipeline operation status based on smart gas Internet of Things (IoT).

Some embodiments of the present disclosure provide a method for safety monitoring of the pipeline operation status based on the smart gas IoT, which is executed by a governmental safety monitoring management platform of the smart gas IoT system. The method includes: obtaining operation data of the gas pipeline in a monitoring area and gas use data of a corresponding gas user from a gas company management platform through a government safety supervision sensor network platform, the operation data including a cumulative operation time and a maintenance time interval, the gas use data including a gas use type, a gas usage sequence, and a change trend of gas usage; obtaining candidate pipeline information from the gas company management platform through the government safety supervision sensor network platform, the candidate pipeline information including information related to at least one candidate pipeline, and the gas company management platform determining the candidate pipeline information based on the operation data and the gas use data; determining, based on the candidate pipeline information, target pipeline information, and sending the target pipeline information to the gas company management platform through the government safety supervision sensor network platform, the target pipeline information including a ranking result of at least one target pipeline; generating, based on the target pipeline information, a maintenance instruction, and sequentially transmitting the maintenance instruction to an device object platform through the government safety supervision sensor network platform, the gas company management platform, and a gas company sensor network platform, the maintenance instruction including a monitoring adjustment instruction and/or a storage allocation instruction, and the monitoring adjustment instruction including a plurality of target monitoring devices and adjustment parameters of the plurality of target monitoring devices, and the target monitoring device are a monitoring devices on the at least one target pipeline, the storage allocation instruction includes an allocation ratio and a minimum allocation space, the allocation ratio being a storage ratio of monitoring data for each of the at least one target pipeline in a storage unit, and the minimum allocation space being a minimum storage space required for the monitoring data of each of the at least one target pipeline in the storage unit; sending the monitoring adjustment instruction to the plurality of target monitoring devices through the device object platform to control the plurality of target monitoring devices to operate according to the corresponding adjustment parameters; and sending the storage allocation instruction to the storage unit through the device object platform to control the storage unit to delete outdated monitoring data and adjust the allocation ratio according to the allocation ratio and the minimum allocation space.

Some embodiments of the present disclosure provides a system for safety monitoring of pipeline operation status based on a smart gas supervision Internet of Things (IoT), the system including: a government safety supervision and management platform, a government safety supervision object platform, a device object platform, a gas user service platform and a gas user platform, the government safety supervision object platform includes a gas company management platform, and the government safety supervision and management platform is configured to: obtain operation data of a gas pipeline in a monitoring area and gas use data of a corresponding gas user from a gas company management platform through a government safety supervision sensor network platform, the operation data including a cumulative operation time and a maintenance time interval, and the gas use data includes a gas use type, a gas usage sequence, and a change trend of gas usage; obtain candidate pipeline information from the gas company management platform through the government safety supervision sensor network platform, the candidate pipeline information including information related to at least one candidate pipeline, and the gas company management platform determining the candidate pipeline information based on the operation data and the gas use data; determine, based on the candidate pipeline information, target pipeline information, and send the target pipeline information to the gas company management platform through the government safety supervision sensor network platform, the target pipeline information including at least one ranking result of a target pipeline; generate, based on the target pipeline information, a maintenance instruction, and sequentially transmit the maintenance instruction to a device object platform through the government safety supervision sensor network platform, the gas company management platform, and a gas company sensor network platform. The maintenance instruction includes a monitoring adjustment instruction and/or a storage allocation instruction, and the monitoring adjustment instruction includes a plurality of target monitoring devices and adjustment parameters of the plurality of target monitoring devices, and the target monitoring device is a monitoring device on the target pipeline, the storage allocation instruction includes an allocation ratio and a minimum allocation space. The allocation ratio is a storage ratio of monitoring data for each of the at least one target pipeline in a storage unit, and the minimum allocation space is a minimum storage space required for the monitoring data of each of the at least one target pipeline in the storage unit; send the monitoring adjustment instruction to the plurality of target monitoring devices through the device object platform to control the plurality of target monitoring devices to operate according to the corresponding adjustment parameters; and send the storage allocation instruction to the storage unit through the device object platform to control the storage unit to delete an outdated monitoring data and adjust the allocation ratio according to the allocation ratio and the minimum allocation space.

Beneficial effects brought about by the above-described content of the present disclosure include, but are not limited to: (1) by obtaining the operation data of the gas pipeline, and the gas use data of the gas user corresponding to the gas pipeline, it is possible to quickly and accurately assess the gas pipelines that need to be maintained based on an operation of the gas pipeline, and the potential impact of gas use situations of different gas users on the gas pipeline; (2) by processing the candidate pipeline information, it is possible to quickly determine the gas pipelines to be prioritized for maintenance, and then monitor and/or maintain the gas pipelines in a timely manner; (3) by adjusting the monitoring device according to the maintenance instruction to obtain more monitoring data, and adjusting a storage resource required for storing the monitoring data, it is conducive to guiding the subsequent maintenance operations.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

To more clearly illustrate the technical solutions of the embodiments of the present disclosure, the accompanying drawings, which are required to be used in the description of the embodiments, are briefly described below. The accompanying drawings do not represent the entirety of the embodiments.

It should be understood that the terms "system," "device", "unit" and/or "module" used herein are a way to distinguish between different components, elements, parts, sections, or assemblies at different levels. Said words may be replaced by other expressions if other words accomplish the same purpose.

Unless the context clearly suggests an exception, the words "one," "a," "one," "a" and/or "the" do not refer specifically to the singular, but may also include the plural. Generally, the terms "including" and "comprising" suggest only the inclusion of clearly identified steps and elements, and the method or apparatus may also include other steps or elements.

When describing the operations performed in the embodiments of the present disclosure in a step-by-step manner, the order of the steps is all interchangeable if not otherwise indicated, the steps may be omitted, and other steps may be included in the process of operation.

Figure 1:
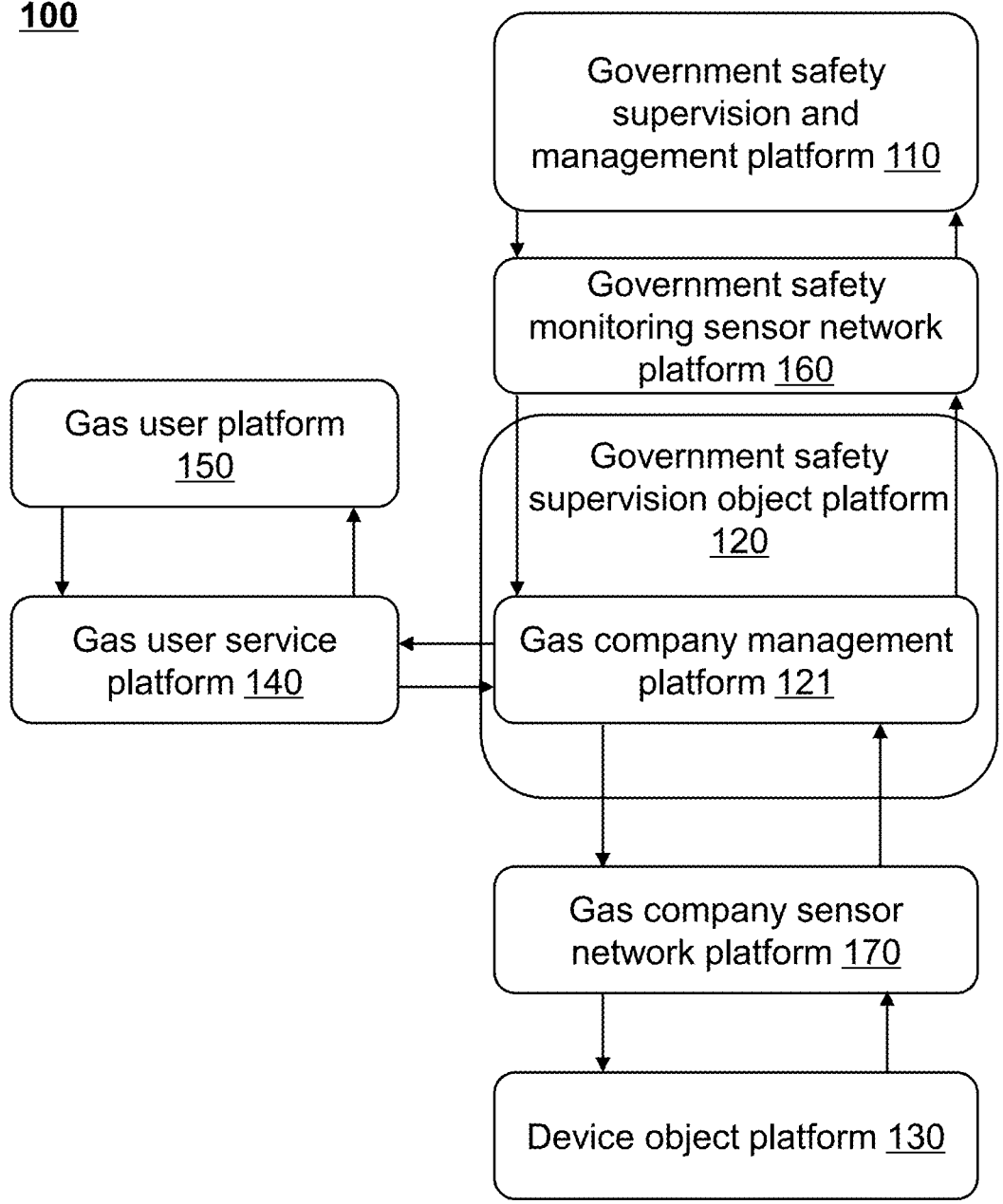
FIG. 1 is a schematic diagram illustrating a platform structure of a smart gas Internet of Things (IoT) according to some embodiments of the present disclosure.

FIG. 1 is a schematic diagram illustrating a platform structure of a smart gas IoT according to some embodiments of the present disclosure. As shown in FIG. 1, a smart gas IoT system 100 may include a government safety supervision and management platform 110, a government safety monitoring sensor network platform 160, a government safety supervision object platform 120, a gas company sensor network platform 170, a device object platform 130, a gas user service platform 140, and a gas user platform 150.

The government safety supervision and management platform 110 refers to an integrated management platform for government management information. In some embodiments, the government safety supervision and management platform 110 may be configured to process and store data of the smart gas IoT system 100.

In some embodiments, the government safety supervision and management platform 110 may be configured to obtain, via a gas company management platform 121, operation data of a gas pipeline within a monitoring area; obtain, via the government safety monitoring sensor network platform 160, the gas use data of the gas user corresponding to the gas pipeline from the gas user platform 150 and/or the gas user service platform 140; obtain candidate pipeline information through the gas company management platform 121; based on the candidate pipeline information, determine and send target pipeline information to the gas company management platform 121; based on the target pipeline information, generate and send a maintenance instruction to the device object platform 130; send a monitoring adjustment instruction to a plurality of target monitoring devices via the device object platform 130 to control operations of the plurality of the target monitoring devices according to corresponding adjustment parameters; send a storage allocation instruction to a storage unit via the device object platform 130 to control the storage unit to delete outdated monitoring data and adjust an allocation ratio according to the allocation ratio and a minimum allocation space.

In some embodiments, the government safety supervision and management platform 110 may be further configured to create a global map structure based on a gas operation map structure; and to determine the target pipeline information based on the global map structure and the candidate pipeline information.

In some embodiments, the government safety supervision and management platform 110 may be further configured to iteratively update an importance of each node in the global map structure; and, based on an updated importance of the each node and the candidate pipeline information, determine the target pipeline information.

In some embodiments, the government safety supervision and management platform 110 may update the importance of each node based on an overall importance of the monitoring area corresponding to each node in the global map structure.

The government safety supervision object platform 120 refers to a platform for government supervision information generation and controlling information execution. In some embodiments, the government safety supervision object platform 120 may include the gas company management platform 121.

The gas company management platform 121 refers to a comprehensive management platform of gas company information. In some embodiments, the gas company management platform 121 may interact with the government safety supervision and management platform 110, the device object platform 130, the gas user service platform 140, and the gas user platform 150. For example, the gas company management platform 121 may obtain gas use data uploaded by the gas user platform 150 and/or the gas user service platform 140.

In some embodiments, the gas company management platform 121 may interact with the government safety supervision and management platform 110 via the government safety monitoring sensor network platform 160. The government safety monitoring sensor network platform 160 refers to a platform for integrated management of government sensor information. For example, the government safety monitoring sensor network platform 160 may obtain the candidate pipeline information uploaded by the gas company management platform 121. For another example, the government safety monitoring sensor network platform 160 may send the candidate pipeline information to the government safety supervision and management platform 110.

In some embodiments, the gas company management platform 121 may interact with the device object platform 130 via the gas company sensor network platform 170. The gas company sensor network platform 170 refers to a platform that integrates the management of sensor information of a gas company. In some embodiments, the gas company sensor network platform 170 may be configured as a communication network or gateway, etc. In some embodiments, the gas company management platform 121 may be configured to determine the candidate pipeline information based on the operation data and the gas use data.

In some embodiments, the gas company management platform 121 may be further configured to determine, based on the operation data and the gas use data, a dynamic inspection level corresponding to the gas pipeline; based on the dynamic inspection level corresponding to the gas pipeline and the monitoring data, determine the candidate pipeline information.

In some embodiments, the gas company management platform 121 may be further configured to determine a gas use risk based on a gas use type and a change trend of gas usage; determine a pipeline impurity accumulation degree based on a gas usage sequence; determine an operation stability index based on a cumulative operation time and a maintenance time interval, determine the operation stability index by weighted fusion; and determine the dynamic inspection level based on the gas use risk, the pipeline impurity accumulation degree, and the operation stability index.

In some embodiments, the gas company management platform 121 may be further configured to determine the pipeline impurity accumulation degree based on the gas usage sequence, a pipeline length, and a preset pipeline level, by an optimal formula model, the optimal formula model being determined based on historical data through modeling regression.

In some embodiments, the gas company management platform 121 may be further configured to construct the gas operation map structure based on the gas use risk, the pipeline impurity accumulation degree, and the operation stability index; the dynamic inspection level is determined based on the gas operation map structure through a first prediction model, the first prediction model being a machine learning model.

In some embodiments, the gas company management platform 121 may be further configured to determine and send a gas monitoring standard corresponding to the dynamic inspection level to the device object platform 130 based on the dynamic inspection level corresponding to the gas pipeline; obtain alarm information via the device object platform 130; and determine the candidate pipeline information based on the alarm information and the dynamic inspection level.

In some embodiments, the gas company management platform 121 may be further configured to determine pipeline maintenance information based on the alarm information, the monitoring data, the gas use data, the preset pipeline level, and the pipeline impurity accumulation degree via a second prediction model.

The device object platform 130 refers to a functional platform for perceptual information generation and controlling information execution. In some embodiments, the device object platform 130 may interact with the government safety supervision object platform 120 (e.g., the gas company management platform 121). For example, the device object platform 130 may upload the monitoring data to the storage unit and/or the gas company management platform 121.

In some embodiments, the device object platform 130 may include the storage unit. The storage unit may be used to store the monitoring data for all of the gas pipelines in the gas network. In some embodiments, the storage unit may store the monitoring data for each target pipeline.

The gas user service platform 140 refers to a platform used to provide gas service to the gas user. In some embodiments, the gas user service platform 140 may interact with the gas company management platform 121 and the gas user platform 150. For example, the gas user service platform 140 may obtain a gas usage uploaded by the gas user platform 150.

In some embodiments, the gas user service platform 140 may process information and/or data uploaded by the gas user platform 150. For example, the gas user service platform 140 may calculate a change rate of the gas usage over time based on the gas usage uploaded by the gas user platform 150.

The gas user platform 150 refers to a platform for interacting with the user. In some embodiments, the gas user platform 150 may be configured as a terminal device. The terminal device may include a mobile device, a tablet computer, a laptop computer, etc.

In some embodiments, the smart gas IoT system 100 may further include a processor. In some embodiments, the processor may process the information and/or data related to the smart gas IoT system 100 to perform one or more of the functions described in the present disclosure. In some embodiments, the processor may include one or more engines (e.g., a single-chip processing engine or a multi-chip processing engine). Merely by way of example, the processor may include a central processing unit (CPU), an application-specific integrated circuit (ASIC), an application-specific instruction processor (ASIP), a graphics processor (GPU), a physical processor (PPU), a digital signal processor (DSP), etc. or any combination of the above. In some embodiments, the processor may interact with a plurality of platforms included in the IoT system 100 (e.g., the government safety supervision and management platform, the government safety supervision object platform, the device object platform, etc.).

For detailed descriptions of the foregoing, please refer to the descriptions of FIGS. 2-5.

According to some embodiments of the present disclosure, based on the smart gas IoT system 100, an information operation closed loop may be formed between various functional platforms for a coordinated and regular operation, thereby realizing informatization and smartness of the monitoring of the operation status of the gas pipeline.

Figure 2:
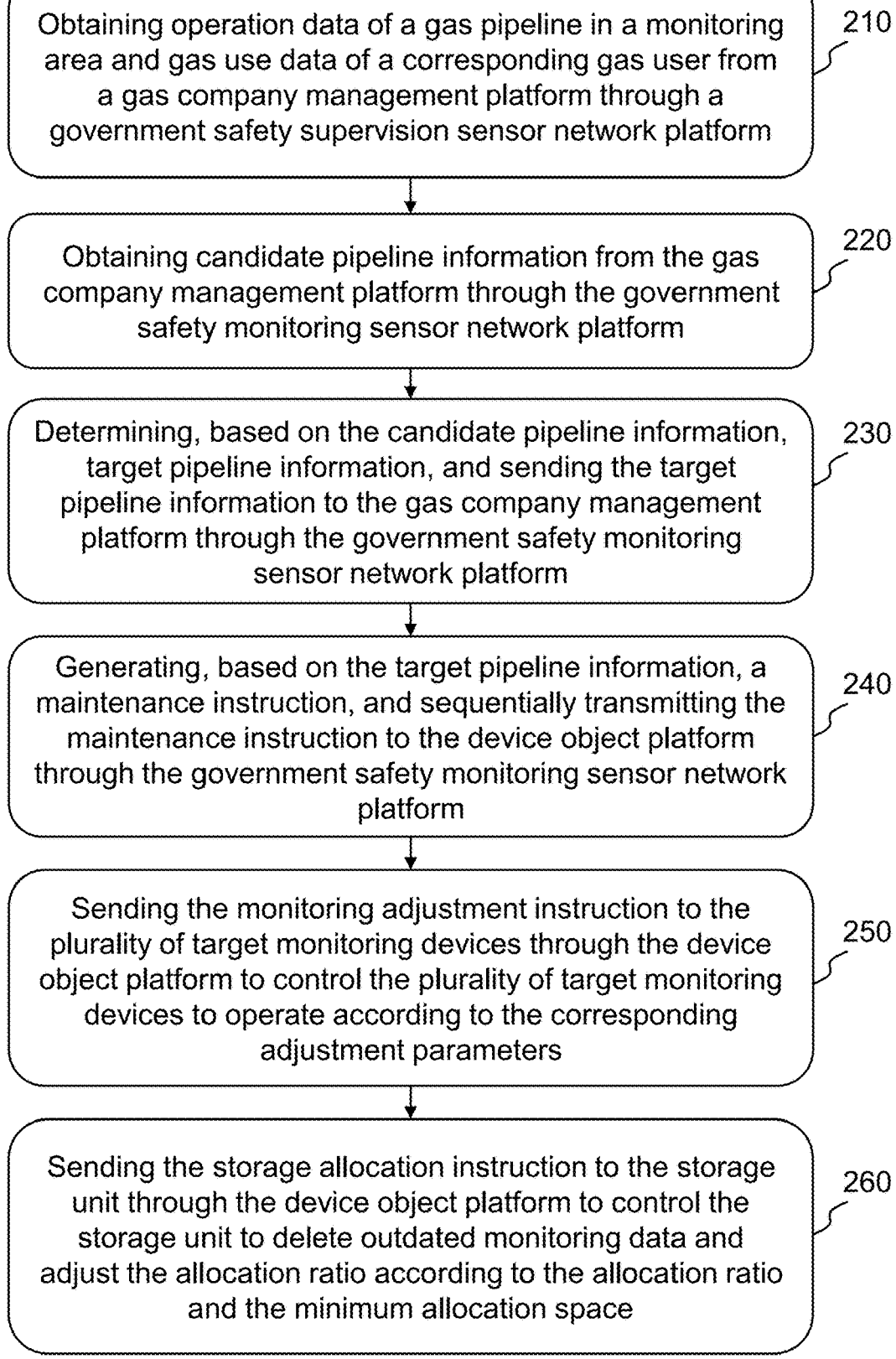
FIG. 2 is a flowchart illustrating an exemplary method for safety monitoring of a pipeline operation status based on a smart gas IoT according to some embodiments of the present disclosure.

FIG. 2 is a flowchart illustrating an exemplary method for safety monitoring of a pipeline operation status based on smart gas IoT according to some embodiments of the present disclosure. In some embodiments, a process 200 is performed by a government safety supervision and management platform (hereinafter referred to as the supervision and management platform). As shown in FIG. 2, the process 200 includes the following steps.

In 210, obtaining operation data of a gas pipeline in a monitoring area and gas use data of a corresponding gas user from a gas company management platform through a government safety supervision sensor network platform.

The monitoring area refers to an area where the gas pipeline monitored by a gas company is located. In some embodiments, each gas company may correspond to one or more monitoring areas. Correspondingly, the gas company management platform of the gas company may obtain the operation data of the gas pipeline of the one or more monitoring areas. In some embodiments, a plurality of gas companies may correspond to one monitoring area, i.e., the monitoring areas of different gas companies may intersect. Correspondingly, the gas company management platform of the plurality of gas companies may obtain the operation data of the gas pipeline in the same monitoring area.

There may be a plurality of gas pipelines in the monitoring area. The gas company may name the gas pipelines in the monitoring area by numbering, etc. to refer to the gas pipelines.

The operation data refers to data related to an operation of the gas pipeline. In some embodiments, the operation data may include a cumulative operation time and a maintenance time interval. In some embodiments, each gas pipeline may correspondingly obtain one operation data.

The cumulative operation time refers to a length of time from a moment when the gas pipeline is put into service to a current moment. The cumulative operation time may be expressed in days/hours.

The maintenance time interval refers to a time interval between a moment when the gas pipeline is maintained for the last time and the current moment. The maintenance time interval may be expressed in days/hours.

In some embodiments, the gas company management platform may query the time information corresponding to a number in an operation table based on the number of the gas pipeline. The operation table may include the numbers of all gas pipelines in the monitoring area and the corresponding time information. The time information may include the moment when the gas pipeline is put into service, the moment when the gas pipeline is maintained for the last time, etc. The time information may be determined by the system or by human pre-input. The operation table may be preset.

In some embodiments, the gas company management platform may calculate a difference between the moment when the gas pipeline was put into service and the current moment, and determine the aforementioned difference as the cumulative operation time. The gas company management platform may calculate the difference between the moment when the gas pipeline is maintained for the last time and the current moment, and determine the aforementioned difference as the maintenance time interval.

In some embodiments, the supervision and management platform may obtain the operation data of the gas pipeline in the monitoring area via the gas company management platform. For example, the supervision and management platform may obtain the operation data of the gas pipeline within the monitoring area from the gas company management platform via a government safety monitoring sensor network platform. In some embodiments, the gas company management platform may obtain the operation data of the gas pipeline in the monitoring area uploaded by a device object platform. For example, the gas company management platform may obtain the operation data of the gas pipeline within the monitoring area from the device object platform via the gas company sensor network platform.

The gas use data refers to data related to the use of gas by the gas user. In some embodiments, the gas use data may include a gas use type, a gas usage sequence, and a change trend of gas usage.

The gas use type refers to a purpose of gas use by the gas user. In some embodiments, the gas use type may include an industrial type, a commercial type, and a residential living type. Gas use risks of different gas use types are different, for example, the industrial type generally has the highest gas use risk.

In some embodiments, the gas use type may be obtained by a user input at a gas user platform and/or a gas user service platform.

The gas usage sequence refers to a sequence including a gas usage by the gas user over a plurality of different preset time periods in the past. In some embodiments, each element in the gas usage sequence represents a gas usage over a preset time period. The preset time period may be set in advance. For example, the preset time period may include 1 month, 1 quarter, and 1 year, etc. Exemplarily, the gas usage sequence may be indicated as (gas usage for the past 1 month, gas usage for the past 1 quarter, gas usage for the past 6 months, gas usage for the past 1 year).

In some embodiments, as the gas pipeline located upstream may correspond to a plurality of the gas users, the gas usage in the gas usage sequence may be a sum of the gas usage of the plurality of the gas users corresponding to the gas pipeline.

In some embodiments, the gas user platform may determine, when each preset time period ends, the gas usage corresponding to the aforesaid preset time period by, e.g., reading a reading of a gas meter of the gas user, and upload the gas usage corresponding to the aforesaid preset time period to the gas user service platform. In some embodiments, the gas user service platform may form the gas usage sequence based on the gas usage of a plurality of different preset time periods in the past uploaded by the gas user platform.

The change trend of gas usage may indicate changes in gas usage over the plurality of preset time periods in the past. In some embodiments, the change trend of gas usage may be characterized in a vector. The vector may include a change rate of the gas usage in a later preset time period compared to the gas usage in a previous preset time period. The change rate may be expressed as a positive/negative percentage, etc. Exemplarily, the preset time period may be 1 quarter, and the change trend of gas usage may be (−10%, −20%, +10%), −10% indicating that the gas consumption in the first quarter of this year decreased by 10% compared to the gas consumption in the fourth quarter of the previous year, −20% indicating that the gas consumption in the second quarter of this year decreased by 20% compared to the gas consumption in the first quarter of this year, and +10% indicating that the gas consumption in the third quarter of the year has increased by 10% compared to the second quarter of the year.

In some embodiments, the gas user service platform may calculate, based on the gas usage during the plurality of preset time periods in the past uploaded by the gas user platform, the change rate of the gas usage during each of the preset time periods in comparison to the gas usage during the previous preset time period. The resulting multiple change rates are formed into a vector in chronological order, which is the change trend of gas usage.

In some embodiments, the supervision and management platform may obtain the gas use data of the gas user corresponding to the gas pipeline via the gas company management platform. The gas company management platform may obtain, via the gas user platform, the gas use type of the gas user corresponding to the gas pipeline, and obtain, via the gas user service platform, the gas usage sequence of the gas user corresponding to the gas pipeline and the change trend of gas usage.

In 220, obtaining candidate pipeline information from the gas company management platform through the government safety monitoring sensor network platform.

The candidate pipeline information refers to information related to the candidate pipeline. The candidate pipeline refers to the gas pipeline to be evaluated for maintenance. There may be at least one candidate pipeline.

In some embodiments, the candidate pipeline information may include information related to at least one candidate pipeline. In some embodiments, the candidate pipeline information may include a number of the at least one candidate pipeline. In some embodiments, the candidate pipeline information may also include a setup area and the operation data corresponding to the at least one candidate pipeline.

In some embodiments, the gas company management platform may determine the candidate pipeline information in various ways based on the operation data and the gas use data. For example, the gas company management platform may determine, based on the operation data and the gas use data of a plurality of the gas pipelines, a gas pipeline that meets the preset condition as the candidate pipeline, and determine the corresponding setup area, the operation data, the number, etc. as the candidate pipeline information for the candidate pipeline. In some embodiments, the preset condition may include that the maintenance time interval in the operation data exceeds a time threshold and/or that there is a change rate exceeding a change threshold in the trend of the gas usage in the gas use data. The time threshold and the change threshold may be pre-set.

In some embodiments, the gas company management platform may determine a dynamic inspection level corresponding to the gas pipeline based on the operation data and the gas use data, and determine the candidate pipeline information based on a dynamic inspection level and monitoring data corresponding to the gas pipeline.

The dynamic inspection level may reflect a priority with which the gas pipeline is monitored and/or maintained. The dynamic inspection level may be expressed as a numerical value or a rank, etc. For example, level three may indicate that the gas pipeline has the highest priority for monitoring and/or maintenance, and level one may indicate that the gas pipeline has the lowest priority for monitoring and/or maintenance. When the operation data of the gas pipeline and the gas use data of the corresponding gas user change, the gas company management platform may accordingly adjust the dynamic inspection level corresponding to the gas pipeline.

In some embodiments, the gas company management platform may determine the dynamic inspection level of the gas pipeline in a variety of ways based on the operation data of the gas pipeline and the gas use data of the gas users corresponding to the gas pipeline. For example, the gas company management platform may query, based on the operation data and the gas use data, a reference inspection level in a first preset level table corresponding to the operation data and the gas use data, and determine the obtained reference inspection level as the dynamic inspection level. The first preset level table may include a plurality of groups of reference operation data and reference gas use data, and corresponding reference inspection levels. The first preset level table may be set in advance. In some embodiments, the reference inspection levels corresponding to a plurality of sets of the reference operation data and the reference gas use data may be set in advance.

In some embodiments, in response to a change in the operation data of the gas pipeline and the gas use data of the gas user corresponding to the gas pipeline, the gas company management platform may query, based on the changed operation data of the gas pipeline and the gas use data of the gas user corresponding to the gas pipeline, the reference inspection level corresponding to the changed operation data of the gas pipeline and the gas use data of the gas user corresponding to the gas pipeline in the first preset level table, and update the obtained reference inspection level to the dynamic inspection level.

In some embodiments, for the gas pipeline with certain reference operation data and reference gas use data, the gas company management platform may determine an abnormality degree of the gas pipeline based on historical inspection data of the gas pipeline, then determine the reference inspection level corresponding to the reference operation data and the reference gas use data based on a correspondence between the abnormality degree of the gas pipeline and the reference inspection level. The foregoing correspondence may include that the reference inspection level is positively correlated to the abnormality degree, i.e., the higher the abnormality degree, the higher the reference inspection level.

In some embodiments, the historical inspection data of the gas pipeline may include at least one of a pipeline impurity accumulation degree, and a historical maintenance number. In some embodiments, the gas company management platform may determine the abnormality degree of the gas pipeline based on the pipeline impurity accumulation degree and the historical maintenance number of the gas pipeline. For example, the higher the pipeline impurity accumulation degree and the higher the historical maintenance number, the higher the abnormality degree of the gas pipeline. The gas company management platform may obtain a maintenance number of the gas pipeline uploaded by the gas company. For descriptions of the pipeline impurity accumulation degree, please refer to FIG. 3 and the related descriptions.

In some embodiments, the gas company management platform may determine the dynamic inspection level based on the gas use risk, the pipeline impurity accumulation degree, and an operation stability index. For a detailed description of this embodiment, please refer to FIG. 3 and the related descriptions.

The monitoring data refers to data obtained by a monitoring device monitoring the gas pipeline. In some embodiments, the monitoring data may include at least one of a temperature, a pressure, and a gas flow within the gas pipeline. The monitoring device may include a temperature detector, a pressure detector, a gas flow meter, etc. In some embodiments, the monitoring device may be deployed within the gas pipeline.

In some embodiments, a plurality of monitoring devices may be deployed within the gas pipeline to obtain a plurality of groups of monitoring data. The monitoring device may upload the obtained monitoring data to the device object platform.

In some embodiments, the gas company management platform may obtain the monitoring data via the device object platform.

In some embodiments, the gas company management platform may compare a gas monitoring standard and the plurality of groups of monitoring data of the gas pipeline; in response to that a number of the monitoring data that do not meet the gas monitoring standard reaching a preset number threshold, the gas pipeline is determined as the candidate pipeline, and the corresponding setup area, operation data, and number are determined as the candidate pipeline information. The preset number threshold may be set in advance by the system or by human, and the preset number threshold is not more than a total number of the monitoring data.

The gas monitoring standard refers to a standard monitoring data range. The standard range refers to a value range that conforms to an industry standard. In some embodiments, the gas monitoring standard may include the standard range of temperature, the standard range of pressure, and the standard range of gas flow. The monitoring data does not meet the gas monitoring standard may include any one or a combination of the temperature in the monitoring data exceeding or falling below the standard range for temperature, the pressure in the monitoring data exceeding or falling below the standard range for pressure, or the gas flow in the monitoring data exceeding or falling below the standard range of gas flow.

In some embodiments, the gas pipelines with different dynamic inspection levels correspond to different gas monitoring standards. In some embodiments, the gas company management platform may query, based on the dynamic inspection level, a reference gas monitoring standard corresponding to the dynamic inspection level in a preset monitoring table, and determine the obtained reference gas monitoring standard as the gas monitoring standard. The preset monitoring table may include a plurality of the dynamic inspection levels and the corresponding reference gas monitoring standard. The preset monitoring table may be set in advance.

In some embodiments, the gas monitoring standard may include a correspondence between a monitoring data range and an alarm level, and the foregoing correspondence may include each type of the monitoring data range corresponding to the alarm level. For descriptions of the alarm level, please refer to FIG. 5 and the related descriptions.

In some embodiments of the present disclosure, determining the gas monitoring standard based on the dynamic inspection level corresponding to the gas pipeline may consider a current priority of the gas pipeline to be monitored and/or maintained when determining the gas monitoring standard, thus determining a more reasonable gas monitoring standard; by comparing the gas monitoring standard and the monitoring data, the candidate pipeline information may be easily and quickly determined.

In some embodiments, the gas company management platform may determine the candidate pipeline information based on the alarm information and the dynamic inspection level. Please refer to FIG. 5 and the related descriptions for more information on this section.

In 230, determining, based on the candidate pipeline information, target pipeline information, and sending the target pipeline information to the gas company management platform through the government safety monitoring sensor network platform.

The target pipeline information refers to information related to a target pipeline. The target pipeline refers to a gas pipeline determined for maintenance. There may be at least one target pipeline. In some embodiments, the target pipeline may be the gas pipeline requiring maintenance determined from one or more monitoring areas.

In some embodiments, the target pipeline information may include information related to at least one target pipeline. In some embodiments, the target pipeline information may include a ranking result and corresponding number of the at least one target pipeline. In some embodiments, the target pipeline information may include the setup area and the operation data corresponding to the target pipeline.

In some embodiments, the target pipeline information may include pipeline maintenance information for the target pipeline. For descriptions of the pipeline maintenance information, please refer to FIG. 5 and the related descriptions.

In some embodiments, the supervision and management platform may determine the target pipeline information based on the candidate pipeline information in various ways. For example, the supervision and management platform may rank, based on an average difference of the candidate pipelines, a plurality of candidate pipelines in one or more monitoring areas in a preset manner, and in the ranking result, select a preset number of the top-ranked candidate pipelines as the target pipelines. The preset number may be set in advance. The preset manner may include from great to small, etc.

The average difference of the candidate pipelines refers to an average value of the differences of a plurality of groups of the monitoring data of the gas pipeline that exceed or fall below the gas monitoring standard. In some embodiments, the supervision and management platform may extract the gas monitoring standards of the gas pipeline in the candidate pipeline information and the plurality of groups of the monitoring data that do not meet the gas monitoring standards, and calculate a difference value that each group of the monitoring data exceeds or falls below the gas monitoring standards, and average the obtained plurality of groups of difference values to obtain the average difference of the candidate pipeline. For more detailed description of the candidate pipeline information, please refer to Step 220 and the associated descriptions.

In some embodiments, the supervision and management platform may also rank the monitoring areas in a preset manner based on a monitoring area priority; and then, rank the plurality of the candidate pipelines within each monitoring area in the preset manner based on the average difference of the candidate pipelines within each monitoring area; in the ranking result of the monitoring areas, select a preset number of top-ranked monitoring areas as prioritized monitoring areas; and in the ranking result of the candidate pipelines in the prioritized monitoring areas, select a preset number of top-ranked candidate pipelines as the target pipelines. The preset quantity may be set in advance. The priority of the monitoring area may reflect a priority of the gas pipelines in the monitoring area that require priority maintenance. The priority of the monitoring area may be preset. For example, if the gas pipelines in urban areas need to be prioritized for maintenance compared to those in suburbs, the priority of the monitoring area in the urban areas is higher than the priority of the monitoring area in the suburbs.

In some embodiments, the supervision and management platform may determine the ranking result of the target pipelines as the target pipeline information. In some embodiments, the supervision and management platform may determine information such as the setup area, the operation data, and the number corresponding to the target pipeline as the target pipeline information.

In some embodiments, the supervision and management platform may create a global map structure based on a gas operation map structure; and determine the target pipeline information based on the global map structure and the candidate pipeline information.

The global map structure may reflect an actual positional relationship of the monitoring device, gas ancillary facilities, and the gas users in the entire gas pipeline network. The gas ancillary facilities may include gas gate stations, gas regulating stations, etc.

The global map structure is a data structure including nodes and edges, with edges connecting nodes, and the nodes and the edges may have features. In some embodiments, the nodes of the global map structure represent the monitoring devices, the gas ancillary facilities, and the gas users. For example, the nodes of the global map structure may include three types, with a first type corresponding to the monitoring devices, a second type corresponding to the gas ancillary facilities, and a third type corresponding to the gas users. The node features may include an initial importance of the node. The importance may reflect a level of importance of the node. In some embodiments, the initial importance of the node may be an average value of preset pipeline levels of downstream gas pipelines connected to the node. For descriptions of the preset pipeline level, please refer to FIG. 3 and the related descriptions.

The edges of the global map structure may indicate the gas pipelines configured between nodes. The features of the edges may include a pipeline maintenance level. In some embodiments, the edges of the global map structure may be directed edges, with directions of the directed edges indicating a direction of gas flow within the gas pipeline. For descriptions of the pipeline maintenance levels, please refer to FIG. 5 and the related descriptions.

In some embodiments, the gas company management platform may stitch together the gas operation map structures corresponding to different monitoring areas into the global map structure based on a connectivity relationship between the gas pipelines in the gas pipeline network. For example, the target monitoring area refers to the monitoring area where an integration is currently performed. The gas company management platform may traverse the gas pipelines at the edge of the target monitoring area to determine the gas pipelines connected to the gas pipelines in the rest of the monitoring area; splice the rest of the monitoring area and the target monitoring area in accordance with the connection relationship between the gas pipelines, and take the spliced monitoring area as the new target monitoring area; the above steps are repeated until all the monitoring areas are spliced as one, which is the global map structure. For more descriptions about the gas operation map structure, please refer to FIG. 4 and the related descriptions.

In some embodiments, the supervision and management platform may rank the nodes from highest to lowest based on the importance of each node and thus rank the plurality of the candidate pipelines downstream of each node from highest to lowest based on the ranking result of the nodes. In the result obtained by ranking the candidate pipelines based on the ranking result of the nodes, the ranks of the plurality of candidate pipelines in the downstream pipelines of the same node are the same. In some embodiments, the supervision and management platform may further rank the plurality of candidate pipelines in the downstream pipelines of the same node from highest to lowest based on the pipeline maintenance level of the gas pipeline. For descriptions of the pipeline maintenance level, please refer to FIG. 5 and the related descriptions.

In some embodiments, the supervision and management platform may select a preset number of the candidate pipelines with high ranks as the target pipelines among the ranking result of the candidate pipelines, and thereby determine the target pipeline information. The preset number may be set in advance.

In some embodiments, the supervision and management platform may iteratively update the importance of each node in the global map structure; and determine the target pipeline information based on the updated importance of each node and the candidate pipeline information.

In some embodiments, the supervision and management platform may update, based on the initial importance of each node in the global map structure, through a plurality of rounds of iterations, the importance of each node until the preset conditions are met, and the update ends. The last updated importance of each node is taken as the updated importance of the each node. The preset conditions may include a number of iterative updates being maximized and a change in the importance of all the nodes being less than an importance threshold. The importance threshold may be preset. The updated importance refers to the importance of the node after the plurality of rounds of iterative updates are completed.

In some embodiments, during each round of iterative update, the supervision and management platform may select a node to be updated, traverse the other nodes pointed to by the node to be updated, weight and sum the importance of the other nodes obtained from the traversal, and the result obtained is the importance of the node to be updated after this round of update. The round of iterative update is completed until the supervision and management platform has updated all the nodes to be updated in the global map structure according to the above steps. The other nodes pointed to by the nodes to be updated are nodes who have directed edges between the nodes to be updated, and the starting point of the directed edge is the node to be updated.

In some embodiments, the supervision and management platform may update the importance of each node in the global map structure by the following formula (1):

$$V'_i = p * V_i + q * \sum (V_k * R_{ik}) \qquad (1)$$

where $V_i$ denotes a current importance of the ith node, $V'_i$ denotes the importance of the ith node after a round of iterative update, the ith node is a to-be-updated node, $V_k$ denotes the importance of the kth node pointed to by the ith node, and a range of k may include 1, 2, 3, ..., K, K denotes a number of other nodes pointed to by the ith node, $R_{ik}$ denotes the pipeline maintenance level of the edge pointed to by the ith node to the kth node, and the range of i may include 1, 2, 3, ..., A, A denotes a total number of nodes in the global map structure, and p, q denote the weight coefficients. In some embodiments, p, q may be preset.

In some embodiments, the supervision and management platform may traverse the nodes pointing to the node to be updated, and determine a reciprocal of the number of nodes obtained from the traversal as the weight factor p.

In some embodiments, the supervision and management platform may also update the importance of each node based on an overall importance of the monitoring area corresponding to each node in the global map structure.

The overall importance of the monitoring area may reflect the importance of all of the gas pipelines within the monitoring area. In some embodiments, the overall importance of the monitoring area may be related to the gas use risk and the pipeline impurity accumulation degree of the gas pipelines in the monitoring area, and the supervision and management platform may determine the overall importance based on the gas use risk and the pipeline impurity accumulation degree of the gas pipelines in the monitoring area. Exemplarily, the supervision and management platform may determine the overall importance by using the following formula (2):

$$Z = (1/n) \sum (X_t * Y_t) \qquad (2)$$

where Z denotes the overall importance of the monitoring area, $X_t$ denotes the gas use risk of the t-th gas pipeline, $Y_t$ denotes the pipeline impurity accumulation degree of the t-th gas pipeline, the range of t may include 1, ..., n, and n denotes the number of the gas pipelines in the monitoring area. For descriptions of the gas use risk and the pipeline impurity accumulation degree, please refer to FIG. 3 and the related descriptions.

In some embodiments, the supervision and management platform may determine the weight factor corresponding to the node to be updated based on the overall importance of the monitoring area. For example, the supervision and management platform may use the overall importance of the monitoring area directly as the weighting factor q in formula (2) above. For another example, the supervision and management platform may transform the overall importance of the monitoring area to a preset range by normalization etc., and use the normalized overall importance as the weight coefficient q in formula (2) above. The preset range may be set in advance, for example, (0, 1).

In some embodiments of the present disclosure, by updating the importance of each node based on the overall importance of the monitoring area, the nodes of the more important monitoring area may be more significant, which in turn makes the importance of each node in the global map structure more consistent with an actual situation.

In some embodiments, the supervision and management platform may rank the nodes from high to low based on the updated importance of the each node, and thereby ranking the plurality of candidate pipelines downstream of each node from high to low based on the ranking results of the nodes. The plurality of candidate pipelines in the downstream pipelines of the same node are ranked identically in the results obtained by ranking the candidate pipelines based on the ranking results of the nodes. In some embodiments, the supervision and management platform may further rank the plurality of the candidate pipelines in the downstream pipelines of the same node from high to low based on the pipeline maintenance level of the gas pipeline. For descriptions of the pipeline maintenance level, please refer to FIG. 5 and the related descriptions.

In some embodiments, the supervision and management platform may select the preset number of the candidate pipelines with a high ranking as a target pipeline among the ranking results of the candidate pipelines and thereby determine the target pipeline information. The preset number may be set in advance.

In some embodiments of the present disclosure, by updating the importance of each node through multiple rounds of iterations, a more accurate global map structure may be obtained, which in turn determines more accurate target pipeline information.

In some embodiments of the present disclosure, through the construction of the global map structure, the huge scattered gas pipeline network and its attributes may be effectively organized, so as to quickly and efficiently obtain the importance of each node in the gas pipeline network, and then obtain a more realistic ranking result of the candidate pipelines, which is conducive to the determination of more accurate target pipeline information.

In some embodiments, the supervision and management platform may send the target pipeline information to the gas company management platform. The gas company management platform may maintain the target pipeline based on the pipeline maintenance information in the target pipeline information. For descriptions of the pipeline maintenance information, please refer to FIG. 5 and the related descriptions.

In 240, generating, based on the target pipeline information, a maintenance instruction, and sequentially transmitting the maintenance instruction to the device object platform through the government safety monitoring sensor network platform.

The maintenance instruction refers to an instruction related to a collection of the monitoring data from the target pipeline.

In some embodiments, the maintenance instruction may include a monitoring adjustment instruction and/or a storage allocation instruction.

The monitoring adjustment instruction refers to an instruction used to adjust device parameters of the target monitoring device. The target monitoring device refers to the monitoring device on the target pipeline. In some embodiments, the monitoring adjustment instruction may be used to control the target monitoring device to operate in accordance with the adjustment parameters.

In some embodiments, the monitoring adjustment instruction may include a plurality of the target monitoring devices and the adjustment parameters for the plurality of the target monitoring devices. The adjustment parameters may include device parameters such as data collection frequencies, data upload frequencies, etc. of the monitoring devices.

In some embodiments, the supervision and management platform may determine corresponding data collection frequency and data upload frequency based on the ranking result of the target pipeline. For example, the higher the ranking result of the target pipeline, the higher the data collection frequency and the higher the data upload frequency.

The storage allocation instruction refers to an instruction that controls the adjustment of a storage space by a storage unit. In some embodiments, the storage allocation instruction may include an allocation ratio and a minimum allocation space.

The allocation ratio refers to a proportion of the monitoring data for each of the at least one target pipeline determined above that is stored in the storage unit. In some embodiments, the storage unit may adjust an original allocation ratio based on the allocation ratio in the storage allocation instruction.

In some embodiments, the supervision and management platform may determine a corresponding allocation ratio based on the ranking result of the target pipeline. For example, the higher the ranking result of the target pipeline, the higher the allocation ratio. In some embodiments, the allocation ratio may be correlated to the data collection frequency by the monitoring device. For example, the higher the data collection frequency, the higher the allocation ratio.

The minimum allocation space refers to the minimum storage space required by the monitoring data for each of the at least one target pipeline determined above in the storage unit. In some embodiments, the supervision and management platform may determine the corresponding minimum allocation space based on the ranking result of the target pipeline. For example, the higher the ranking result of the target pipeline, the greater the minimum allocation space.

In some embodiments, the supervision and management platform may determine the corresponding minimum allocation space based on the data collection frequency and the data upload frequency of the target pipeline. For example, the higher the data collection frequency and the data upload frequency of the target pipeline, the more monitoring data of the target pipeline, and the more storage space is required in the storage unit; the higher the allocation ratio and the greater the minimum allocation space.

In some embodiments, the supervision and management platform may determine, based on the target pipeline information, the adjustment parameters for the target monitoring device and thereby generating a monitoring adjustment instruction. In some embodiments, the supervision and management platform may determine, based on the target pipeline information, the allocation ratio and the minimum allocation space, which in turn generate the storage allocation instruction. Please refer to the preceding section for more descriptions on determining the adjustment parameters, the allocation ratio, and the minimum allocation space.

In some embodiments, in response to an insufficient remaining storage space in the storage unit, the supervision and management platform may determine outdated monitoring data that needs to be deleted based on the minimum allocation space and generate the storage allocation instruction for deleting the outdated monitoring data for each of the minimum allocation space required for the monitoring data of the target pipeline.

In 250, sending the monitoring adjustment instruction to the plurality of target monitoring devices through the device object platform to control the plurality of target monitoring devices to operate according to the corresponding adjustment parameters.

Merely by way of example, the target monitoring device may collect and upload data on the target pipeline in accordance with the corresponding adjustment parameters in the monitoring adjustment instruction.

In 260, sending the storage allocation instruction to the storage unit through the device object platform to control the storage unit to delete the outdated monitoring data and adjust the allocation ratio according to the allocation ratio and the minimum allocation space.

Merely by way of example, the storage unit may adjust the ratio and size of the storage space for each target pipeline in accordance with the allocation ratio and the minimum allocation space and delete the outdated monitoring data.

In some embodiments of the present disclosure, by determining the candidate pipeline information based on the operation data and the gas use data, the gas pipeline that needs maintenance is quickly and accurately assessed based on the operation situation of the gas pipeline and a potential impact of use situations of different gas users on the gas pipeline; by determining the target pipeline information based on the candidate pipeline information and generating and sending the maintenance instruction, the target pipeline to be prioritized for maintenance is determined, and the monitoring of the target pipeline may be enhanced, and by adjusting the storage resources required for the target pipeline, the monitoring of the gas pipeline is made more efficient and saves a cost of manpower and time.

It should be noted that the foregoing description of the process 200 is for the purpose of exemplification and illustration only and does not limit the scope of application of the present disclosure. For those skilled in the art, various corrections and changes to the process hand-eye calibration may be made under the guidance of the present disclosure. However, these corrections and changes remain within the scope of the present disclosure.

Figure 3:
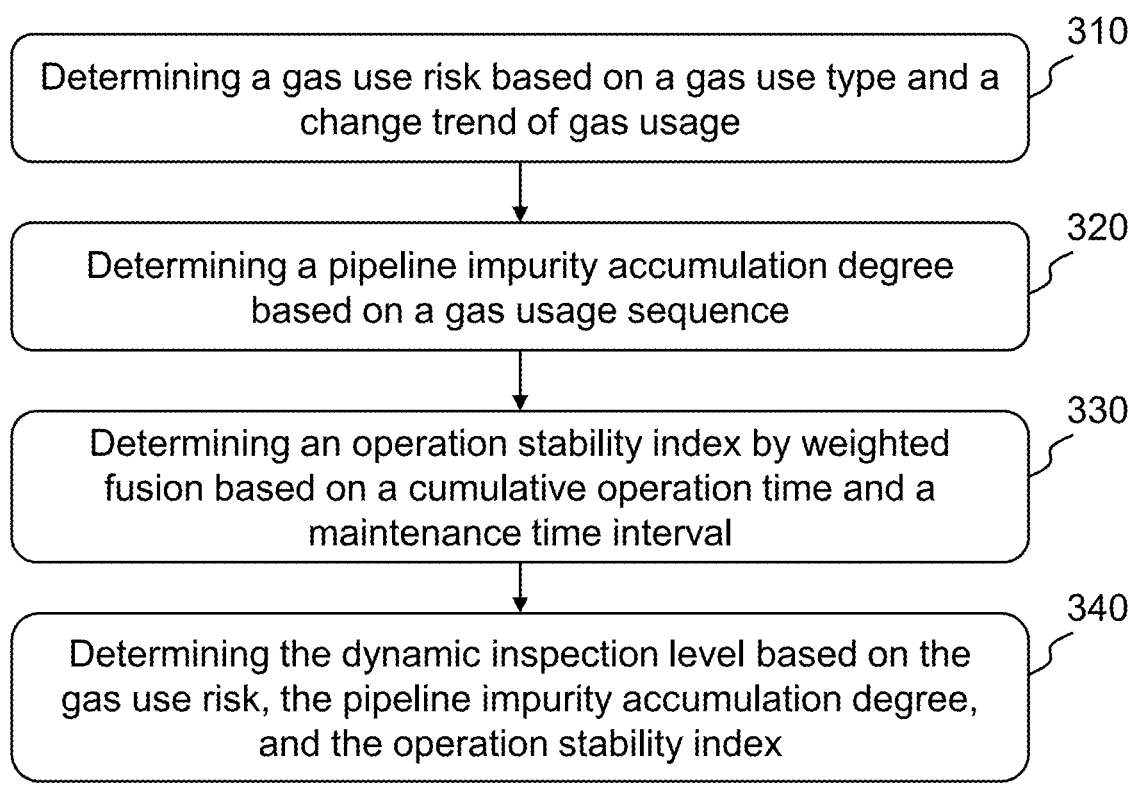
FIG. 3 is a flowchart illustrating an exemplary process for determining a dynamic inspection level according to some embodiments of the present disclosure.

FIG. 3 is a flowchart illustrating an exemplary process for determining a dynamic inspection level according to some embodiments of the present disclosure.

In 310, determining a gas use risk based on a gas use type and a change trend of gas usage.

The gas use risk may reflect a magnitude of the risk that occurs during a gas use. The gas use risk may be expressed in a form of a numerical value, etc. The greater the value, the greater the gas use risk.

The gas use risk may be determined in a variety of ways. In some embodiments, the gas company management platform may query, based on an anomaly of the gas use type and the gas usage, a reference gas risk corresponding to the anomaly of the gas use type and the gas usage in a preset risk table, and determine the obtained reference gas use risk as the gas use risk. The preset risk table may include a plurality of groups of abnormalities of the gas use type and the gas usage, as well as the corresponding reference gas use risks. The preset risk table may be set in advance. For more explanations about the gas use type and the change trend of gas usage, please refer to FIG. 2 and the related descriptions.

In some embodiments, the anomaly of the gas usage may include a gas usage anomaly and a normal gas usage. The gas usage anomaly may include a surge or a sharp decrease in the gas usage. In some embodiments, the gas company management platform may compare the change trend of gas usage with a historical change trend of gas usage; if the change trend of gas usage and the historical change trend of gas usage in the same period of time exceeds a dosage threshold, the anomaly of the gas usage is determined to be the gas usage anomaly; if the difference between the change trend of gas usage and the historical change trend of gas usage in the same time period does not exceed the dosage threshold, the anomaly of gas usage is determined to be a normal gas usage. The historical change trend of gas usage is a change trend of gas usage over a historical time period. The usage threshold may be set in advance.

Exemplarily, the change trend of gas usage for the four quarters of this year is (−10%, −20%, +10%, +50%), the historical change trend of gas usage for the four quarters of the previous year is (−10%, −20%, +10%, +70%), and the usage threshold is 15%. The difference in a change rate between the trend of the gas pipeline and the historical change trend of gas usage in the same quarter is (0, 0, 0, 20%). At this point, the difference exceeds the usage threshold of 15%, so the anomaly of gas usage is determined to be the gas usage anomaly.

In some embodiments, the gas company management platform may extract a number of maintenance times of the gas pipeline corresponding to the gas use type and the anomaly of the gas usage in the historical data; and determine, based on a correspondence between the number of maintenance times of the gas pipeline and the gas use risk, the gas use risk. The foregoing correspondence may include that the gas use risk is positively correlated to the number of maintenance times, i.e., the higher the number of maintenance times, the higher the gas use risk.

In 320, determining a pipeline impurity accumulation degree based on a gas usage sequence.

The pipeline impurity accumulation degree may reflect an amount of impurities accumulated within the gas pipeline. The impurities may include dust, particles, etc. The pipeline impurity accumulation degree may be expressed by a numerical value, and the greater the value, the greater the pipeline impurity accumulation degree.

In some embodiments, the pipeline impurity accumulation degree may be represented by a total mass of impurities per unit of pipeline, and the gas company management platform may normalize the total mass of impurities per unit of pipeline to a preset range. For example, (0,1).

In some embodiments, the gas company management platform may determine the pipeline impurity accumulation degree in a variety of ways based on the gas usage sequence. For example, the gas company management platform may determine a corresponding trend of the gas usage based on the gas usage sequence for a preset number of time periods in the past; and determine, based on the correspondence between the change trend of gas usage and the pipeline impurity accumulation degree, the pipeline impurity accumulation degree corresponding to the aforementioned change trend of gas usage. The aforesaid correspondence may include a positive correlation between the change trend of gas usage and the pipeline impurity accumulation degree, i.e., the faster the change in gas usage, the higher the pipeline impurity accumulation degree. As another example, the gas company management platform may perform a weighted calculation based on a plurality of gas usage values in the gas usage sequence, and determine a weighted result as the pipeline impurity accumulation degree. A weighting weight may be set manually based on experience, preset by the system, etc. For more descriptions of the gas usage sequence, please refer to FIG. 2 and the related descriptions.

In some embodiments, the gas company management platform may determine the pipeline impurity accumulation degree based on the gas usage sequence, a pipeline length, and a preset pipeline level by an optimal formula model.

The pipeline length refers to an actual length of the pipeline. The pipeline length may be different for different gas pipelines. In some embodiments, the gas company management platform may obtain the pipeline length of the gas pipeline uploaded by the gas company.

The preset pipeline level may reflect a strength of regulation of the gas pipeline. The preset pipeline level may be expressed by a numerical value, and the greater the value, the stronger the regulation of the gas pipeline.

In some embodiments, the supervision and management platform may determine the preset pipeline level based on a number of residential households and/or a density of buildings around the gas pipeline and a delivery pressure of the gas pipeline. For example, the higher the number of residential households around the gas pipeline and the denser the buildings, the higher the delivery pressure of the gas pipeline, and the higher the preset pipeline level.

The optimal formula model refers to a model used to determine the pipeline impurity accumulation degree. The optimal formula model may be an algorithmic formula.

In some embodiments, through a modeling regression, the gas company management platform may determine a functional relationship between the pipeline impurity accumulation degree and the gas usage, the pipeline length, and the preset pipeline level based on the gas usage sequence, the pipeline length, the preset pipeline level, and the actual pipeline impurity accumulation degree corresponding to the gas pipeline in the historical data, and the obtained functional relationship is determined as an optimal joint model. The modeling regression may be performed using a model such as a logistic regression model, a random forest model, a support vector machine (SVM) model, etc.

Exemplarily, the optimal formula model may be represented by the following formula (3):

$$S = t1*B1 + t2*B2 + t3*B3 + X \quad (3)$$

where S denotes the pipeline impurity accumulation degree, B1 denotes the gas usage corresponding to the closest historical time period to the present in the gas usage sequence, B2 denotes the pipeline length, B3 denotes the preset pipeline level, and t1, t2, t3, and X are constant factors of B1, B2, and B3, respectively. t1, t2, t3, and X may be obtained by modeling regression.

In some embodiments, the gas company management platform may input the gas usage sequence, the pipeline length, and the preset pipeline level into the optimal formula model to obtain the pipeline impurity accumulation degree.

Understandably, as a total amount of impurities within a gas pipeline is relatively fixed, the longer the gas pipeline is, the lower the amount of impurities accumulating per unit length of the gas pipeline, the pipeline impurity accumulation degree is correlated with the length of the pipeline. As the lower the delivery pressure within a gas pipeline, the lower a flow rate of the gas, the easier it is for the impurities to accumulate, the pipeline impurity accumulation degree is also correlated with the delivery pressure, i.e., the pipeline impurity accumulation degree is correlated with the preset pipeline level.

In some embodiments of the present disclosure, when determining the pipeline impurity accumulation degree, a more realistic pipeline impurity accumulation degree may be obtained by considering the actual pipeline length and the delivery pressure. By calculating using the optimal formula model, the correlation between the gas usage sequence, the pipeline length, the preset pipeline level, and the pipeline impurity accumulation degree may be clarified, and a more accurate pipeline impurity accumulation degree may be obtained.

In 330, determining an operation stability index by weighted fusion based on a cumulative operation time and a maintenance time interval.

The operation stability index may reflect a degree of stability of the gas pipeline operation, the higher the operation stability index, the more stable the gas pipeline operation.

For more descriptions of the cumulative operation time and the maintenance time interval, please refer to FIG. 2 and the related descriptions.

In some embodiments, weights of the cumulative operation time and the maintenance time interval may be correlated to the preset pipeline level and the gas use type. Exemplarily, the higher the preset pipeline level, the lower the weights of the cumulative operation time and the maintenance time interval. Exemplarily, the cumulative operation time and the maintenance time interval are weighted lower when the gas use type is industrial. For more descriptions of the preset pipeline level, please refer to Step 320 and the associated descriptions. For more descriptions of the gas use type, please refer to FIG. 2 and the associated descriptions.

Understandably, the higher the preset pipeline level, the higher the gas pipeline delivery pressure, and the more unstable the gas pipeline. When the gas use type is industrial, the gas usage is higher, the gas pipeline delivers a greater amount of gas, and the gas pipeline is prone to instability. The weights of the cumulative operation time and the maintenance time interval are correlated to the preset pipeline level and the gas use type, which is useful for determining a more realistic operation stability index.

In 340, determining the dynamic inspection level based on the gas use risk, the pipeline impurity accumulation degree, and the operation stability index.

In some embodiments, the gas company management platform may query a reference inspection level corresponding to the gas use risk, the pipeline impurity accumulation degree, and the operation stability index in a second preset level table based on the gas use risk, the pipeline impurity accumulation degree, and the operation stability index, and determine the obtained reference inspection level as the dynamic inspection level for the gas pipeline. The second preset level table may include a plurality of groups of the gas use risks, the pipeline impurity accumulation degrees, and the operation stability indexes, and the corresponding reference inspection levels. The second preset level table may be set in advance.

In some embodiments, the gas company management platform may determine the dynamic inspection level based on the gas use risk, the pipeline impurity accumulation degree, and the operation stability index through a first prediction model. For more descriptions of this section, please refer to the relevant descriptions below.

According to some embodiments of the present disclosure, when determining the dynamic inspection level, a more accurate dynamic inspection level may be obtained by considering a magnitude of the risk that may occur, the accumulation of impurities in the gas pipeline, and the degree of stabilization of the gas pipeline in an actual operation of the gas pipeline.

Figure 4:
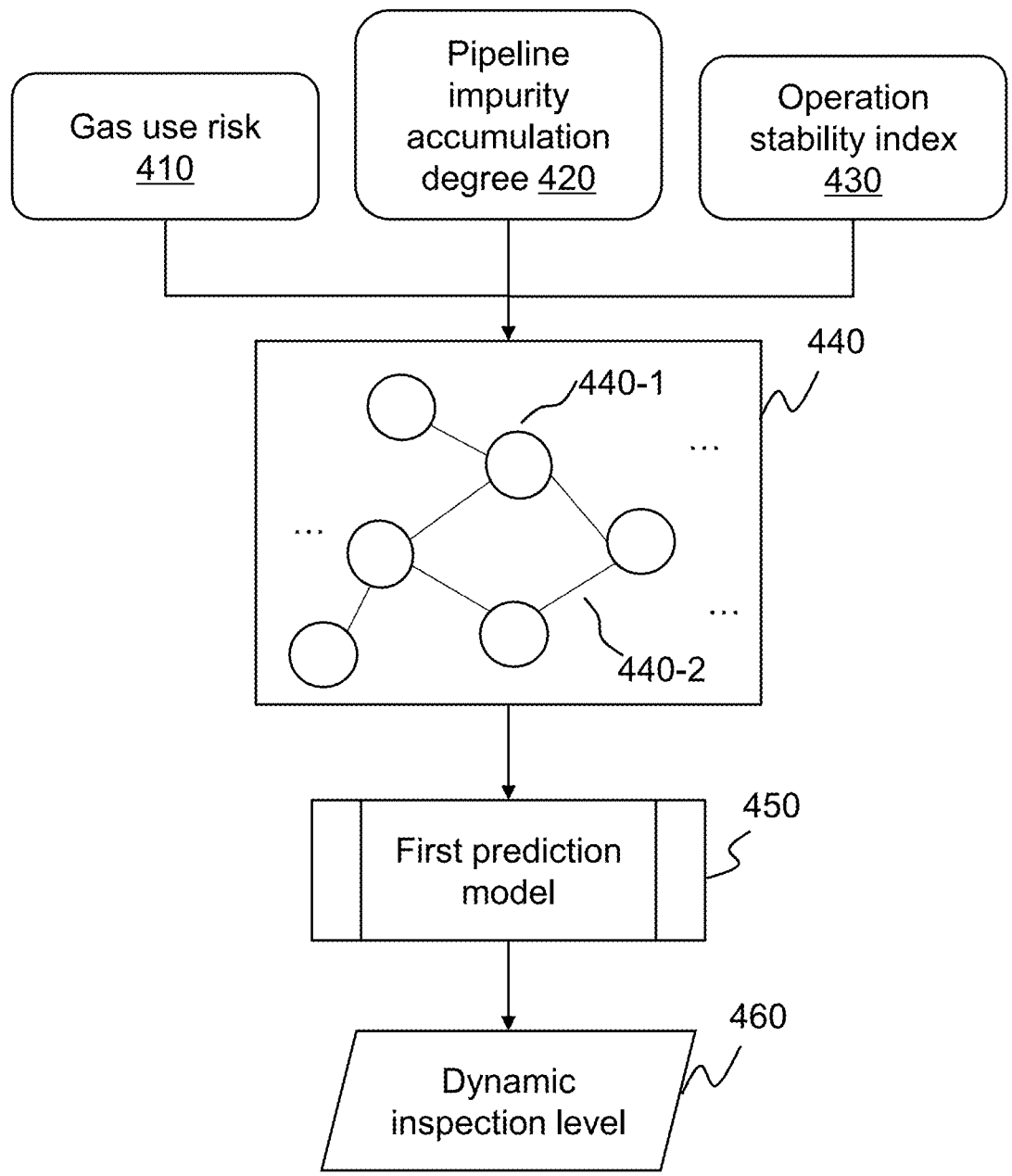
FIG. 4 is a schematic diagram illustrating a first prediction model according to some embodiments of the present disclosure.

In some embodiments, as shown in FIG. 4, the gas company management platform may construct a gas operation map structure 440 based on a gas use risk 410, a pipeline impurity accumulation degree 420, and an operation stability index 430; and the gas company management platform may determine a dynamic inspection level 460 based on a gas operation map structure 440, by a first prediction model 450.

The gas operation map structure may reflect an actual positional relationship of a monitoring device, a gas ancillary facility, and a gas user in the monitoring area. The gas ancillary facility may include a gas gate station, a gas regulator station, etc.

The gas operation map structure is a data structure consisting of nodes and edges, with edges connecting the nodes, and the nodes and edges may have features. For example, a great number of nodes 410-1 and a great number of edges 410-2 may be included in the gas operation map structure 410, as illustrated in FIG. 4.

In some embodiments, one monitoring area may correspond to one gas operation map structure.

In some embodiments, the nodes of the gas operation map structure represent the monitoring devices, gas ancillary facilities, and the gas users within the monitoring area. For example, the nodes of the gas operation map structure may include three types, with the first type corresponding to the monitoring device, the second type corresponding to the gas ancillary facility, and the third type corresponding to the gas user. The node feature may include a node type.

The edges of the gas operation map structure may indicate nodes configured with the gas pipelines between them. The feature of the edges may include the gas use risk, the pipeline impurity accumulation degree, and the operation stability index. In some embodiments, the edges of the gas operation map structure may be directed edges, with a direction of the directed edge indicating a direction of gas flow within the gas pipeline. For more descriptions of the gas use risk, the pipeline impurity accumulation degree, and the operation stability index, please refer to FIG. 3 and the related descriptions.

In some embodiments, the gas company management platform may construct the gas operation map structure based on connection relationships between the gas pipelines in the monitoring area, using the gas use risk, the pipeline impurity accumulation degree, and the operation stability index as the edge features. For example, the gas company management platform may use the gas pipelines in the monitoring area as the edges of the gas operation map structure, and use the monitoring devices, the gas ancillary facilities, and the gas users at both ends of the gas pipelines as the nodes of the gas operation map structure.

In some embodiments, a gas operation map structure may be constructed corresponding to each monitoring area.

The first prediction model refers to a model for determining a dynamic inspection level, and in some embodiments, the first prediction model may be a machine learning model. For example, the first prediction model may include any one or a combination of a graph neural network (GNN) model, a graph convolutional neural network (GCNN) model, or other customed model structures, etc.

In some embodiments, an input to the first prediction model may include the gas operation map structure, and an output may include the dynamic inspection level. The edge of the first prediction model outputs the dynamic inspection level corresponding to the gas pipeline.

In some embodiments, the gas company management platform may train the first prediction model based on a great number of the first training samples with first labels by, e.g., a gradient descent method. In some embodiments, the first training samples include sample gas operation map structures. The sample gas operation map structure may include a historical map determined based on historical data. The nodes, the node features, and the edges, and the edge features of the historical map are similar to the above description. The first label may be a historical dynamic inspection level.

In some embodiments, the gas company management platform may obtain the historical maintenance number of each gas pipeline corresponding to the sample gas operation map structure manually, and determine, based on the correspondence between the historical maintenance number and the dynamic inspection level, the historical dynamic inspection level of each gas pipeline. As a plurality of points within the gas pipeline need to be maintained, the number of maintenance times for each gas pipeline may include a sum of the number of maintenance times for the plurality of points within the gas pipeline. In some embodiments, the foregoing correspondence may include the dynamic inspection level being positively correlated to the number of maintenance times. Exemplarily, if the number of maintenance times for a gas pipeline is 1-10, the gas company management platform may determine that the dynamic inspection level for the gas pipeline is 1. If the number of maintenance times for a gas pipeline is 10-20, the gas company management platform may determine that the dynamic inspection level of the gas pipeline is 2.

In some embodiments, the gas company management platform may determine the historical dynamic inspection level that meets a first screening condition as the first label corresponding to the sample gas operation map structure.

In some embodiments, the first screening condition may include that after the gas pipeline has been maintained by the gas company management platform, there is not safety issue on the gas pipeline for a preset future time. The safety issue may include a leakage, an explosion, etc. of the gas pipeline. The preset future time may be set in advance. For example, future 6 months.

In some embodiments of the present disclosure, by constructing the gas operation map structure and inputting the gas operation map structure to the first prediction model, it may be easier to clarify the positional relationship between the monitoring device, the gas ancillary facilities, the gas users, and the gas pipelines as well as a topology, thereby realizing a rapid processing of a great amount of data, and thus determining a more accurate dynamic inspection level.

Figure 5:
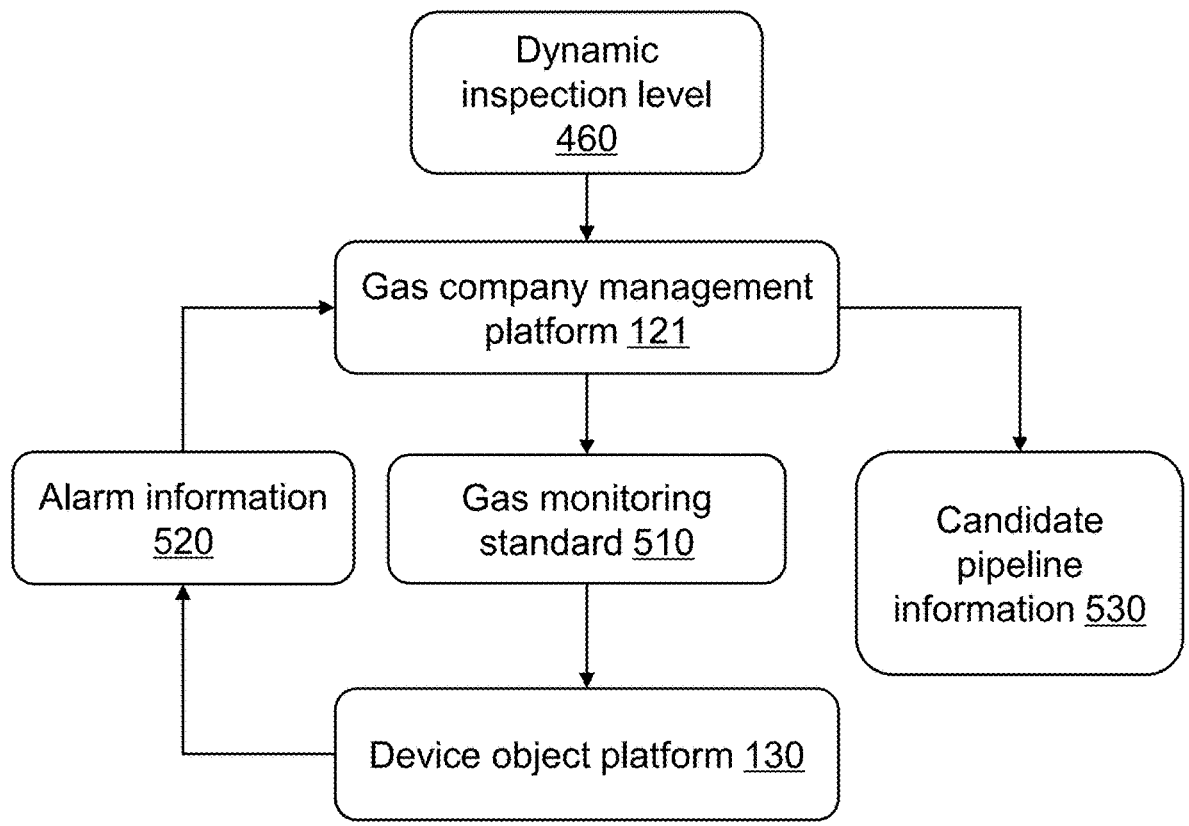
FIG. 5 is a schematic diagram illustrating an exemplary process for determining candidate pipeline information according to some embodiments of the present disclosure.

FIG. 5 is a schematic diagram illustrating an exemplary process for determining candidate pipeline information according to some embodiments of the present disclosure.

In some embodiments, as shown in FIG. 5, the gas company management platform 121 may determine and send, based on the dynamic inspection level 460 corresponding to the gas pipeline, a gas monitoring standard 510 corresponding to a dynamic inspection level to the device object platform 130; obtain alarm information 520 via the device object platform 130; and determine candidate pipeline information 530 based on the alarm information 520 and the dynamic inspection level 460. For more information on the dynamic inspection level and the gas monitoring standard, please refer to FIG. 2 and the related descriptions.

The alarm information may reflect whether an anomaly exists in the monitoring device on the gas pipeline. The anomaly that exists in the monitoring device may include that monitoring data obtained by the monitoring device does not meet the gas monitoring standard. For example, the anomaly existing in the monitoring device may include one or more of the plurality of the monitoring data obtained by the monitoring device not meeting a corresponding gas monitoring standard.

In some embodiments, the alarm information may include point information and an alert level.

The point information refers to an actual position on the gas pipeline of the monitoring device where the anomaly exists. In some embodiments, the device object platform may number the monitoring devices on the gas pipeline, and the point information may include a number of the monitoring device or an actual geographic position of the monitoring device. In some embodiments, the point information may be obtained by a user inputting it to the device object platform.

The alert level may reflect an extent to which the monitoring data obtained by the monitoring device does not meet the gas monitoring standard. The greater a value of the monitoring data exceeding/falling below the gas monitoring standard, the higher the alert level. An alert level of 0 indicates that there is no anomaly in the monitoring device.

In some embodiments, the alert level correlates to the number of types of the monitoring data that does not meet the gas monitoring standard and a difference between the monitoring data that does not meet the gas monitoring standard and the gas monitoring standard. The higher the number of types of the monitoring data that does not meet the gas monitoring standard and the higher the value of the monitoring data that exceeds/falls below the gas monitoring standard, the higher the alert level. For example, an alert level of 1 means that one of the three types of a temperature, a pressure, and a gas flow of the monitoring data slightly exceeds/falls below the gas monitoring standard, or two of the three types of data slightly exceed/fall below the gas monitoring standard. A division of alert level is illustrative only and does not constitute a limitation of the embodiment.

The alarm information may be determined by the device object platform. In some embodiments, by querying the monitoring data range corresponding to the monitoring data in the gas monitoring standard, the device object platform may determine the alert level corresponding to the obtained monitoring data range as the alert level corresponding to the monitoring device based on the monitoring data obtained by the monitoring device.

In some embodiments, the device object platform may represent the point information and the corresponding alert level as a sequence, and determine the obtained sequence as the alarm information. Each element in the sequence represents a monitoring device at a position, and the value of the element represents the alert level corresponding to the monitoring device.

Exemplarily, the alarm information may be (0, 0, 1, 3, 1, 0, 2), which indicates that on this gas pipeline, the alert levels of the monitoring devices numbered 1, 2, 6 are 0; the alert levels of the monitoring devices numbered 3, 5 are 1; the alert level of the monitoring device numbered 4 is 3; and the alert level of the monitoring device numbered 7 is 2.

In some embodiments, the device object platform may interact with the gas company management platform. For example, the device object platform may send the alarm information to the gas company management platform.

In some embodiments, the gas company management platform may determine, based on the alarm information and the dynamic inspection level, an alert ratio and an alert average value of the gas pipeline; and determine whether the gas pipeline is a candidate pipeline based on the alert ratio, the alert average value, and the dynamic inspection level of the gas pipeline.

The alert ratio may reflect a percentage of the monitoring devices with anomalies on the gas pipeline out of a total number of monitoring devices. In some embodiments, the gas company management platform may express the alert ratio by a ratio of the number of monitoring devices with anomalies to the total number of monitoring devices.

The alert average value may reflect an average alert level of the monitoring devices on the gas pipeline. In some embodiments, the gas company management platform may represent the alert average value by a ratio of the total alert level to the number of monitoring devices with anomalies. The total alert level refers to a sum of the alert levels of all monitoring devices on the gas pipeline.

In some embodiments, the gas company management platform may determine a gas pipeline whose alert ratio exceeds a first alert threshold and whose alert average value exceeds a second alert threshold as a candidate pipeline. The first alert threshold and the second alert threshold may be preset based on historical experience.

In some embodiments, the first alert threshold and the second alert threshold for determining whether a gas pipeline is a candidate pipeline are different for the gas pipelines with different dynamic inspection levels. For example, for a gas pipeline with a dynamic inspection level of 1, the first alert threshold may be 30% and the second alert threshold may be 1.3, and for a gas pipeline with a dynamic inspection level of 2, the first alert threshold may be 25% and the second alert threshold may be 1.1.

In some embodiments, the candidate pipeline information may include pipeline maintenance information.

The pipeline maintenance information refers to information related to a pipeline maintenance. In some embodiments, the pipeline maintenance information may include a pipeline maintenance level and/or a pipeline maintenance type.

The pipeline maintenance type refers to a type of work that is performed on a gas pipeline. In some embodiments, the pipeline maintenance type may include a repair, a cleaning, and a remodeling. The repair refers to a maintenance of some areas of a gas pipeline. The cleaning refers to a cleaning of an inside of a gas pipeline. The remodeling refers to remodeling a construction of a gas pipeline, etc.

In some embodiments, one gas pipeline may correspond to a plurality of the pipeline maintenance types. For example, the pipeline maintenance type for a first half of the gas pipeline is cleaning, and the pipeline maintenance type for a second half of the gas pipeline is remolding.

In some embodiments, the pipeline maintenance type is related to the alarm information, the monitoring data, the gas use data, a preset pipeline level, and a pipeline impurity accumulation degree. Exemplarily, there is one area of the alarm information for the gas pipeline where the alarm level of the plurality of monitoring devices is low, the gas flow data in the monitoring data is lower than the other areas, and the pipeline impurity accumulation degree is higher, then gas impurities inside the pipeline are accumulated too much, resulting in a decrease in gas flow; thus, an interior of the gas pipeline needs to be cleaned.

The pipeline maintenance level may reflect an extent to which the gas pipeline requires maintenance. In some embodiments, the pipeline maintenance type may be in a one-to-one correspondence with the pipeline maintenance level. For example, the repair corresponds to a pipeline maintenance level one, the cleaning corresponds to a pipeline maintenance level two, and the remodeling corresponds to a pipeline maintenance level three.

In some embodiments, as one gas pipeline may correspond to a plurality of the pipeline maintenance types, the pipeline maintenance level may be an average of the plurality of the pipeline maintenance types corresponding to the gas pipeline. For example, if there are 2 places in a pipeline that need to be repaired and 2 places that need to be cleaned, the gas company management platform may calculate an average of the plurality of the pipeline maintenance types as $(2*1+2*2)/4=1.5$, i.e., the pipeline maintenance level is 1.5. The gas pipeline that is not in the candidate pipeline information has a pipeline maintenance level of 0.

In some embodiments, the pipeline maintenance information may also include a maintenance area. The maintenance area refers to an area on the gas pipeline that requires maintenance. For example, the maintenance area may be a portion of the pipe area on the gas pipeline or an entire gas pipeline.

In some embodiments, the gas company management platform may determine the pipeline maintenance information based on the alarm information, the monitoring data, the gas use data, the preset pipeline level, and the pipeline impurity accumulation degree, by a second prediction model.

The second prediction model refers to a model for determining the pipeline maintenance information, and in some embodiments, the second prediction model may be a machine learning model. For example, the second prediction model may include any one or a combination of a convolutional neural networks (CNN) model, a neural networks (NN) model, or other customized model structure.

In some embodiments, an input to the second prediction model may include the alarm information, the monitoring data, the gas use data, the preset pipeline level, and the pipeline impurity accumulation degree; and an output may include the pipeline maintenance information. In some embodiments, the pipeline maintenance information for output of the second prediction model may include at least one of a pipeline maintenance type or a maintenance area, i.e., not a pipeline maintenance level.

In some embodiments, the gas company management platform may train the second prediction model based on a large number of the second training samples with the second label by a gradient descent method etc. The second training samples may include sample alarm information, sample monitoring data, sample gas use data, a sample impurity accumulation level, a sample preset pipeline level of the sample gas pipeline, and the second labels may include an actual maintenance situation of the sample gas pipeline corresponding to the second training sample. The actual maintenance situation may include a maintenance type and a maintenance area of the actual maintenance on the sample gas pipeline, as well as the pipeline maintenance level of the sample gas pipeline.

In some embodiments, the second training sample may be obtained based on historical data. The second label may be obtained based on manual labeling.

In some embodiments, the gas company management platform may determine the actual maintenance situation that meets a second screening condition as the second label corresponding to the second training sample.

In some embodiments, the second screening condition may include that after the gas company management platform performs the actual maintenance on the sample gas pipeline, there is not safety issue on the gas pipeline for a preset future time. For descriptions of the safety issue, please refer to FIG. 4 and the related descriptions.

In some embodiments, the gas company management platform may determine a different training sample sets based on a preset pipeline level. The training sample set includes a plurality of identical or similar second training samples and corresponding second labels.

In some embodiments, the gas company management platform may use different training sample sets to train the second prediction model alternately in accordance with a size of the training sample set, with different training sample sets corresponding to different learning rates during the training process. The size of the training sample set may reflect a number of the second training samples in the training sample set. For example, the greater the number of the second training samples, the greater the training sample set size.

The learning rate refers to an adjustment parameter in machine learning that controls a step size or a change rate of an iterative update of the second prediction model. In some embodiments, the learning rate for a single training sample set may be expressed as a single numerical value or a learning rate sequence. The learning rate sequence refers to a sequence including the learning rates of a plurality of training stages, with each element of the sequence representing a learning rate for one training stage.

In some embodiments, the learning rates corresponding to different of training sample sets may be determined based on a training sample feature of the training sample set.

The training sample feature may reflect a feature of the training sample set. In some embodiments, the training sample feature includes the preset pipeline level and a training sample reliability corresponding to the training sample set.

The training sample reliability may reflect a degree of consistency of the second labels corresponding to the same or similar second training samples. In some embodiments, the training sample reliability may be obtained based on manual labeling. It is to be understood that the higher the labeling consistency of the second training samples in the training sample set, the more similar the actual maintenance of the second training samples in the training sample set, the more effective the use of the training sample set to train the second prediction model.

In some embodiments, the gas company management platform may construct a sample feature vector based on the training sample feature, match a reference vector that matches the sample feature vector to meet a preset matching condition in a vector database, and determine a reference learning rate that meets the preset matching condition as the learning rate corresponding to the sample feature vector. The feature vector may be constructed based on the preset pipeline level corresponding to the training sample set and the training sample reliability. In some embodiments, the preset matching condition may include a vector distance being less than a distance threshold, the vector distance may include a Euclidean distance, a cosine distance, etc., and the distance threshold may be preset.

In some embodiments, the supervision and management platform may construct the vector database based on the historical data, and the vector database may include a plurality of reference vectors and the reference learning rates corresponding to the reference vectors. The reference vectors may be sample feature vectors constructed based on historical training sample features.

In some embodiments of the present disclosure, by determining different training sample sets as well as corresponding labels based on a preset pipeline level, and alternately training the second prediction model using different sets of training samples, the training of the second prediction model may be more fitted to the actual situation. Additionally, the different training sample sets correspond to different learning rates during the training process, which effectively controls a step size or a change rate of an iterative update of the second prediction model to obtain a more accurate second prediction model.

In some embodiments of the present disclosure, a great number of data may be processed by the second prediction model, which utilizes a self-learning capability of the machine learning model to find a pattern from the great number of data, and obtain a correlation between the alarm information, the monitoring data, the gas use data, the preset pipeline level, the pipeline impurity accumulation degree, and the pipeline maintenance information, so as to improve the accuracy and efficiency of determining the pipeline maintenance information.

In some embodiments of the present disclosure, by determining the candidate pipeline information based on the alarm information and the dynamic inspection level, when determining the candidate pipeline information, a fact that different areas of the gas pipeline require different degrees of maintenance is considered, and the most required gas pipeline is determined as the candidate pipeline information, which is conducive to determining more accurate target pipeline information.

Some embodiments of the present disclosure further provide a computer-readable storage medium, the storage medium storing computer instructions, and when the computer reads the computer instructions in the storage medium, the computer executes the pipeline operation status safety monitoring method based on the smart gas supervisory IoT system.

In addition, certain features, structures, or characteristics of one or more embodiments of the present disclosure may be suitably combined.

Some embodiments use numbers to describe the number of components or attributes, and it should be understood that such numbers used in the description of the embodiments are modified in some examples by the modifiers "about," "approximately," or "substantially." Unless otherwise noted, the terms "about," "approximately," or "roughly" indicate that a ±20% variation in the stated number is allowed. Correspondingly, in some embodiments, the numerical parameters used in the present disclosure and claims are approximations, which may change depending on the desired characteristics of individual embodiments. In some embodiments, the numerical parameters should take into account the specified number of valid digits and employ general place-keeping. While the numerical domains and parameters used to confirm the breadth of their ranges in some embodiments of the present disclosure are approximations, in specific embodiments such values are set to be as precise as possible within a feasible range.

In the event of any inconsistency or conflict between the descriptions, definitions, and/or the use of terms in the materials cited in the present disclosure and those described in the present disclosure, the descriptions, definitions, and/or the use of terms in the present disclosure shall prevail.

What is claimed is:

1. A method for safety monitoring of pipeline operation status based on a smart gas Internet of Things (IoT), wherein the method is executed by a government safety supervision and management platform of a smart gas IoT system, wherein the smart gas IoT system includes the government safety supervision and management platform, a government safety supervision sensor network platform, a government safety supervision object platform, a gas company sensor network platform, a device object platform, a gas user service platform, a gas user platform, and a processor; and the processor interacts with a plurality of platforms included in the smart gas IoT system; the gas user platform is configured as a terminal device, the terminal device includes a mobile device, a tablet computer, and a laptop computer; and the method comprises:

obtaining operation data of a gas pipeline in a monitoring area and gas use data of a corresponding gas user from a gas company management platform through the government safety supervision sensor network platform, wherein the operation data includes a cumulative operation time and a maintenance time interval, and the gas use data includes a gas use type, a gas usage sequence, and a change trend of gas usage; wherein the gas use type of the gas user corresponding to the gas pipeline is obtained through the gas user platform; the gas usage sequence of the gas user corresponding to the gas pipeline and the change trend of gas usage are obtained through the gas user service platform;

obtaining candidate pipeline information from the gas company management platform through the government safety supervision sensor network platform, wherein the candidate pipeline information includes information related to at least one candidate pipeline, and the gas company management platform determines the candidate pipeline information based on the operation data and the gas use data; wherein the gas company management platform determines the candidate pipeline information based on the operation data and the gas use data, including:

determining a gas use risk based on the gas use type and the change trend of gas usage, including:

querying, based on an anomaly of the gas use type and the gas usage, a reference gas risk corresponding to the anomaly of the gas use type and the gas usage in a preset risk table;

determining the obtained reference gas use risk as the gas use risk; wherein the preset risk table includes a plurality of groups of abnormalities of the gas use type and the gas usage, as well as the corresponding reference gas use risks; the preset risk table is set in advance; and the anomaly of the gas usage includes a gas usage anomaly and a normal gas usage;

comparing the change trend of gas usage with a historical change trend of gas usage;

in response to that the change trend of gas usage and the historical change trend of gas usage in a same period of time exceeds a dosage threshold, determining the anomaly of the gas usage to be the gas usage anomaly;

in response to that a difference between the change trend of gas usage and the historical change trend of gas usage in the same time period does not exceed the dosage threshold, determining the anomaly of gas usage to be the normal gas usage: wherein the historical change trend of gas usage is a change trend of gas usage over a historical time period;

extracting a number of maintenance times of the gas pipeline corresponding to the gas use type and the anomaly of the gas usage in the historical data; and determining, based on a correspondence between the number of maintenance times of the gas pipeline and the gas use risk; wherein the correspondence includes the gas use risk being positively correlated to the number of maintenance times;

determining a pipeline impurity accumulation degree based on the gas usage sequence;

determining an operation stability index by weighted fusion based on the cumulative operation time and the maintenance time interval; wherein weights of the cumulative operation time and the maintenance time interval are correlated to a preset pipeline level and the gas use type; and the higher the preset pipeline level, the lower the weights of the cumulative operation time and the maintenance time interval;

determining a dynamic inspection level based on the gas use risk, the pipeline impurity accumulation degree, and the operation stability index, including:

constructing a gas operation map structure based on the gas use risk, the pipeline impurity accumulation degree, and the operation stability index; wherein the gas operation structure reflects an actual positional relationship of a monitoring device, a gas ancillary facility, and a gas user in the monitoring area; the gas ancillary facility includes a gas gate station, a gas regulator station; one monitoring area corresponds to one gas operation map structure; nodes of the gas operation map structure represent the monitoring device, the gas ancillary facility, and the gas user in the monitoring area; edges of the gas operation map structure indicate nodes configured with the gas pipelines between them; features of the edges include the gas use risk, the pipeline impurity accumulation degree, and the operation stability index; and the edge of the gas operation map structure is directed edge, with a direction of the directed edge indicating a direction of gas flow within the gas pipeline; and determining the dynamic inspection level by a first prediction model based on the gas operation map structure, the first prediction model being a machine learning model; wherein the first prediction model is trained based on a great number of first training samples with first labels by a gradient descent process; the first training samples include sample gas operation map structures; the sample gas operation map structure includes a historical map determined based on historical data; the first label being a historical dynamic inspection level; and determining, based on the dynamic inspection level and monitoring data corresponding to the gas pipeline, the candidate pipeline information; wherein the monitoring data includes at least one of a temperature, a pressure, and the gas flow within the gas pipeline, and the candidate pipeline refers to a gas pipeline to be evaluated for maintenance;

determining, based on the candidate pipeline information, target pipeline information, and sending the target pipeline information to the gas company management platform through the government safety supervision sensor network platform, wherein the target pipeline information includes a ranking result of at least one target pipeline;

generating, based on the target pipeline information, a maintenance instruction, and sequentially transmitting the maintenance instruction to the device object platform through the government safety supervision sensor network platform, the gas company management platform, and the gas company sensor network platform, wherein the maintenance instruction includes a monitoring adjustment instruction and/or a storage allocation instruction, and the monitoring adjustment instruction includes a plurality of target monitoring devices and adjustment parameters of the plurality of target monitoring devices, and the target monitoring device are monitoring devices on the at least one target pipeline, the storage allocation instruction includes an allocation ratio and a minimum allocation space, wherein the allocation ratio is a storage ratio of monitoring data for each of the at least one target pipeline in a storage unit, and the minimum allocation space is a minimum storage space required for the monitoring data of each of the at least one target pipeline in the storage unit;

sending the monitoring adjustment instruction to the plurality of target monitoring devices through the device object platform to control the plurality of target monitoring devices to operate according to the corresponding adjustment parameters; wherein the adjustment parameters include data collection frequencies and data upload frequencies of the monitoring devices; the target monitoring device collects and uploads data on the target pipeline in accordance with the corresponding adjustment parameters in the monitoring adjustment instruction; and sending the storage allocation instruction to the storage unit through the device object platform to control the storage unit to delete outdated monitoring data and adjust the allocation ratio according to the allocation ratio and the minimum allocation space; wherein the storage unit adjusts a ratio and a size of the storage space for each target pipeline in accordance with the allocation ratio and the minimum allocation space and deletes the outdated monitoring data; and in response to an insufficient remaining storage spacing in the storage unit, determining the outdated monitoring data that needs to be deleted based on the minimum allocation space and generates the storage allocation instruction for deleting the outdated monitoring data for each of the minimum allocation space required for the monitoring data of the target pipeline, which meets the minimum allocation space required for the monitoring data of the each target pipeline.

2. The method of claim 1, wherein the determining, based on the dynamic inspection level and the monitoring data corresponding to the gas pipeline, the candidate pipeline information includes:

determining, based on the dynamic inspection level corresponding to the gas pipeline, a gas monitoring standard corresponding to the dynamic inspection level, and sending the gas monitoring standard corresponding to the dynamic inspection level to the device object platform;

obtaining alarm information through the device object platform, the alarm information being generated by the device object platform based on the gas monitoring standard and monitoring data corresponding to the gas pipeline; wherein the alarm information reflects whether an anomaly exists in the monitoring device on the gas pipeline; and the anomaly existing in the monitoring device includes that the monitoring data obtained by the monitoring device does not meet the gas monitoring standard;

determining the candidate pipeline information based on the alarm information and the dynamic inspection level; and determining a gas pipeline whose alert ratio exceeds a first alert threshold and whose alert average value exceeds a second alert threshold as a candidate pipeline based on the candidate pipeline information, wherein the alert ratio reflects a percentage of the monitoring devices with anomalies on the gas pipeline out of a total number of monitoring devices, and the alert average value reflects an average alert level of the monitoring devices on the gas pipeline.

3. The method of claim 1, wherein the determining, based on the candidate pipeline information, target pipeline information, and sending the target pipeline information to the gas company management platform through the government safety supervision sensor network platform includes:

creating a global map structure based on the gas operation map structure; and determining the target pipeline information based on the global map structure and the candidate pipeline information.

4. The method of claim 3, wherein the determining the target pipeline information based on the global map structure and the candidate pipeline information includes:

iteratively updating an importance of each node in the global map structure, wherein nodes of the global map structure represent the monitoring devices, gas ancillary facilities, and gas users; and determining the target pipeline information based on an updated importance of the each node and the candidate pipeline information.

5. A system for safety monitoring of pipeline operation status based on a smart gas Internet of Things (IoT), wherein the smart gas IoT system includes a government safety supervision and management platform, a government safety supervision object platform, a device object platform, a gas user service platform, and a gas user platform, the government safety supervision object platform includes a gas company management platform, and a processor; and the processor interacts with a plurality of platforms included in the smart gas IoT system; the gas user platform is configured as a terminal device, the terminal device includes a mobile device, a tablet computer, and a laptop computer; and the government safety supervision and management platform is configured to:

obtain operation data of a gas pipeline in a monitoring area and gas use data of a corresponding gas user from a gas company management platform through a government safety supervision sensor network platform, wherein the operation data includes a cumulative operation time and a maintenance time interval, and the gas use data includes a gas use type, a gas usage sequence, and a change trend of gas usage; wherein the gas use type of the gas user corresponding to the gas pipeline is obtained through the gas user platform; the gas usage sequence of the gas user corresponding to the gas pipeline and the change trend of gas usage are obtained through the gas user service platform;

obtain candidate pipeline information from the gas company management platform through the government safety supervision sensor network platform, wherein the candidate pipeline information includes information related to at least one candidate pipeline, and the gas company management platform determines the candidate pipeline information based on the operation data and the gas use data; wherein the gas company management platform determines the candidate pipeline information based on the operation data and the gas use data, including:

determining a gas use risk based on the gas use type and the change trend of gas usage, including:

querying, based on an anomaly of the gas use type and the gas usage, a reference gas risk corresponding to the anomaly of the gas use type and the gas usage in a preset risk table;

determining the obtained reference gas use risk as the gas use risk; wherein the preset risk table includes a plurality of groups of abnormalities of the gas use type and the gas usage, as well as the corresponding reference gas use risks; the preset risk table is set in advance; and the anomaly of the gas usage includes a gas usage anomaly and a normal gas usage;

comparing the change trend of gas usage with a historical change trend of gas usage;

in response to that the change trend of gas usage and the historical change trend of gas usage in a same period of time exceeds a dosage threshold, determining the anomaly of the gas usage to be the gas usage anomaly;

in response to that a difference between the change trend of gas usage and the historical change trend of gas usage in the same time period does not exceed the dosage threshold, determining the anomaly of gas usage to be the normal gas usage; wherein the historical change trend of gas usage is a change trend of gas usage over a historical time period;

extracting a number of maintenance times of the gas pipeline corresponding to the gas use type and the anomaly of the gas usage in the historical data; and determining, based on a correspondence between the number of maintenance times of the gas pipeline and the gas use risk; wherein the correspondence includes the gas use risk being positively correlated to the number of maintenance times;

determining a pipeline impurity accumulation degree based on the gas usage sequence;

determining an operation stability index by weighted fusion based on the cumulative operation time and the maintenance time interval; wherein weights of the cumulative operation time and the maintenance time interval are correlated to a preset pipeline level and the gas use type; and the higher the preset pipeline level, the lower the weights of the cumulative operation time and the maintenance time interval;

determining a dynamic inspection level based on the gas use risk, the pipeline impurity accumulation degree, and the operation stability index, including:

constructing a gas operation map structure based on the gas use risk, the pipeline impurity accumulation degree, and the operation stability index; wherein the gas operation structure reflects an actual positional relationship of a monitoring device, a gas ancillary facility, and a gas user in the monitoring area; the gas ancillary facility includes a gas gate station, a gas regulator station; one monitoring area corresponds to one gas operation map structure; nodes of the gas operation map structure represent the monitoring device, the gas ancillary facility, and the gas user in the monitoring area; edges of the gas operation map structure indicate nodes configured with the gas pipelines between them; features of the edges include the gas use risk, the pipeline impurity accumulation degree, and the operation stability index; and the edge of the gas operation map structure is directed edge, with a direction of the directed edge indicating a direction of gas flow within the gas pipeline; and determining the dynamic inspection level by a first prediction model based on the gas operation map structure, the first prediction model being a machine learning model; wherein the first prediction model is trained based on a great number of first training samples with first labels by a gradient descent process; the first training samples include sample gas operation map structures; the sample gas operation map structure includes a historical map determined based on historical data; the first label being a historical dynamic inspection level; and determining, based on the dynamic inspection level and monitoring data corresponding to the gas pipeline, the candidate pipeline information; wherein the monitoring data includes at least one of a temperature, a pressure, and the gas flow within the gas pipeline, and the candidate pipeline refers to a gas pipeline to be evaluated for maintenance;

determine, based on the candidate pipeline information, target pipeline information, and send the target pipeline information to the gas company management platform through the government safety supervision sensor network platform, wherein the target pipeline information includes at least one ranking result of a target pipeline;

generate, based on the target pipeline information, a maintenance instruction, and sequentially transmit the maintenance instruction to the device object platform through the government safety supervision sensor network platform, the gas company management platform, and the gas company sensor network platform, wherein the maintenance instruction includes a monitoring adjustment instruction and/or a storage allocation instruction, and the monitoring adjustment instruction includes a plurality of target monitoring devices and adjustment parameters of the plurality of target monitoring devices, and the target monitoring device is a monitoring device on the target pipeline, the storage allocation instruction includes an allocation ratio and a minimum allocation space, wherein the allocation ratio is a storage ratio of monitoring data for each of the at least one target pipeline in a storage unit, and the minimum allocation space is a minimum storage space required for the monitoring data of each of the at least one target pipeline in the storage unit;

send the monitoring adjustment instruction to the plurality of target monitoring devices through the device object platform to control the plurality of target monitoring devices to operate according to the corresponding adjustment parameters; wherein the adjustment parameters include data collection frequencies, and data upload frequencies of the monitoring devices; the target monitoring device collects and uploads data on the target pipeline in accordance with the corresponding adjustment parameters in the monitoring adjustment instruction; and send the storage allocation instruction to the storage unit through the device object platform to control the storage unit to delete an outdated monitoring data and adjust the allocation ratio according to the allocation ratio and the minimum allocation space; wherein the storage unit adjusts a ratio and a size of the storage space for each target pipeline in accordance with the allocation ratio and the minimum allocation space and deletes the outdated monitoring data; and in response to an insufficient remaining storage spacing in the storage unit, determining outdated monitoring data that needs to be deleted based on the minimum allocation space and generate the storage allocation instruction for deleting the outdated monitoring data for each of the minimum allocation space required for the monitoring data of the target pipeline, which meets the minimum allocation space required for the monitoring data of the each target pipeline.

6. The system of claim 5, wherein the gas company management platform is further configured to:

determine, based on the dynamic inspection level corresponding to the gas pipeline, a gas monitoring standard corresponding to the dynamic inspection level, and send the gas monitoring standard corresponding to the dynamic inspection level to the device object platform;

obtain alarm information through the device object platform, the alarm information being generated by the device object platform based on the gas monitoring standard and monitoring data corresponding to the gas pipeline; wherein the alarm information reflects whether an anomaly exists in the monitoring device on the gas pipeline; and the anomaly existing in the monitoring device includes that the monitoring data obtained by the monitoring device does not meet the gas monitoring standard;

determine the candidate pipeline information based on the alarm information and the dynamic inspection level; and determining a gas pipeline whose alert ratio exceeds a first alert threshold and whose alert average value exceeds a second alert threshold as a candidate pipeline based on the candidate pipeline information, wherein the alert ratio reflects a percentage of the monitoring devices with anomalies on the gas pipeline out of a total number of monitoring devices, and the alert average value reflects an average alert level of the monitoring devices on the gas pipeline.

7. The system of claim 5, wherein the government safety supervision and management platform is further configured to:

create a global map structure based on the gas operation map structure; and determine the target pipeline information based on the global map structure and the candidate pipeline information.

8. A non-transitory computer-readable storage medium, the storage medium storing computer instructions, and when the computer reads the computer instructions in the storage medium, the computer executes the method for safety monitoring of pipeline operation status based on a smart gas Internet of Things according to claim 1.

9. The method of claim 2, wherein the candidate pipeline information further includes pipeline maintenance information, the pipeline maintenance information includes a pipeline maintenance level and/or a pipeline maintenance type, the determining the candidate pipeline information based on the alarm information and the dynamic inspection level includes:

determining the pipeline maintenance information through a second prediction model based on the alarm information, the monitoring data, the gas use data, the preset pipeline level, and the pipeline impurity accumulation degree, wherein the second prediction model is a machine learning model; the second prediction model is trained based on second training samples with a second label by a gradient descent process; the second training samples include sample alarm information, sample monitoring data, sample gas use data, a sample impurity accumulation level, a sample preset pipeline level of the sample gas pipeline, and the second label includes an actual maintenance situation of the sample gas pipeline corresponding to the second training sample; the actual maintenance situation includes a maintenance type and a maintenance area of the actual maintenance on the sample gas pipeline, as well as the pipeline maintenance level of the sample gas pipeline.

10. The method of claim 9, wherein the method further includes:

determining different training sample sets based on the preset pipeline level, wherein the training sample set includes a plurality of identical second training samples and the corresponding second labels;

using the different training sample sets to train the second prediction model alternately in accordance with a size of the training sample set, with the different training sample sets corresponding to different learning rates during a training process;

wherein the greater the number of the second training samples, the greater the training sample set size;

the learning rates corresponding to different of training sample sets are determined based on a training sample feature of the training sample set;

the training sample feature reflects a feature of the training sample set; and the training sample feature includes the preset pipeline level and a training sample reliability corresponding to the training sample set; and constructing a sample feature vector based on the training sample feature, matching a reference vector that matches the sample feature vector to meet a preset matching condition in a vector database, and determining a reference learning rate that meets the preset matching condition as the learning rate corresponding to the sample feature vector; wherein the feature vector is constructed based on the preset pipeline level corresponding to the training sample set and the training sample reliability.

11. The method of claim 1, wherein the method further includes:

determining corresponding data collection frequency and data upload frequency based on the ranking result of the target pipeline, wherein the higher the ranking result of the target pipeline, the higher the data collection frequency and the higher the data upload frequency;

determining the corresponding allocation ratio based on the ranking result of the target pipeline; wherein the higher the ranking result of the target pipeline, the higher the allocation ratio, and the allocation ratio is correlated to the data collection frequency by the monitoring device;

determining the corresponding minimum allocation space based on the ranking result of the target pipeline, the higher the ranking result of the target pipeline, the greater the minimum allocation space; the higher the data collection frequency and the data upload frequency of the target pipeline, the more monitoring data of the target pipeline and the more storage space is required in the storage unit; the higher the allocation ratio and the greater the minimum allocation space.

* * * * *